United States Patent [19]

Ogura

[11] Patent Number: 5,019,916
[45] Date of Patent: May 28, 1991

[54] DIGITAL COPIER WITH A FACSIMILE FUNCTION

[75] Inventor: Masaaki Ogura, Kawasaki, Japan

[73] Assignee: Ricoh Company, Ltd., Tokyo, Japan

[21] Appl. No.: 368,945

[22] Filed: Jun. 14, 1989

[30] Foreign Application Priority Data

May 9, 1987 [JP] Japan .................................. 62-113074

[51] Int. Cl.⁵ .............................................. H04N 1/00
[52] U.S. Cl. .................... 358/401; 358/449; 358/496; 355/308; 355/311
[58] Field of Search ................. 358/449, 496, 401; 355/145 H, 308, 311

[56] References Cited

U.S. PATENT DOCUMENTS

| | | | |
|---|---|---|---|
| 4,190,246 | 2/1980 | Sasuga | 271/265 X |
| 4,439,790 | 3/1984 | Yoshida | 358/449 |
| 4,763,889 | 8/1988 | Dei et al. | 271/9 |
| 4,814,893 | 3/1989 | Katoh | 358/449 |

Primary Examiner—Edward L. Coles, Sr.
Attorney, Agent, or Firm—Oblon, Spivak, McClelland, Maier & Neustadt

[57] ABSTRACT

A digital copier or like image forming apparatus is capable of selectively operating both as a copier or as a facsimile terminal and which can accommodate multi-sized papers of different sizes at one time. Image data transmitted by facsimile is printed out on a paper of any desired size at a receive station and is stored temporarily if the unit is being operated as a facsimile machine at the time of reception.

10 Claims, 33 Drawing Sheets

Fig. 7

| F (8) | F (8) | A (8) | C (8) | FC (8) | FI (n) | FCS (16) | F (8) |

MATRIX A

MATRIX B

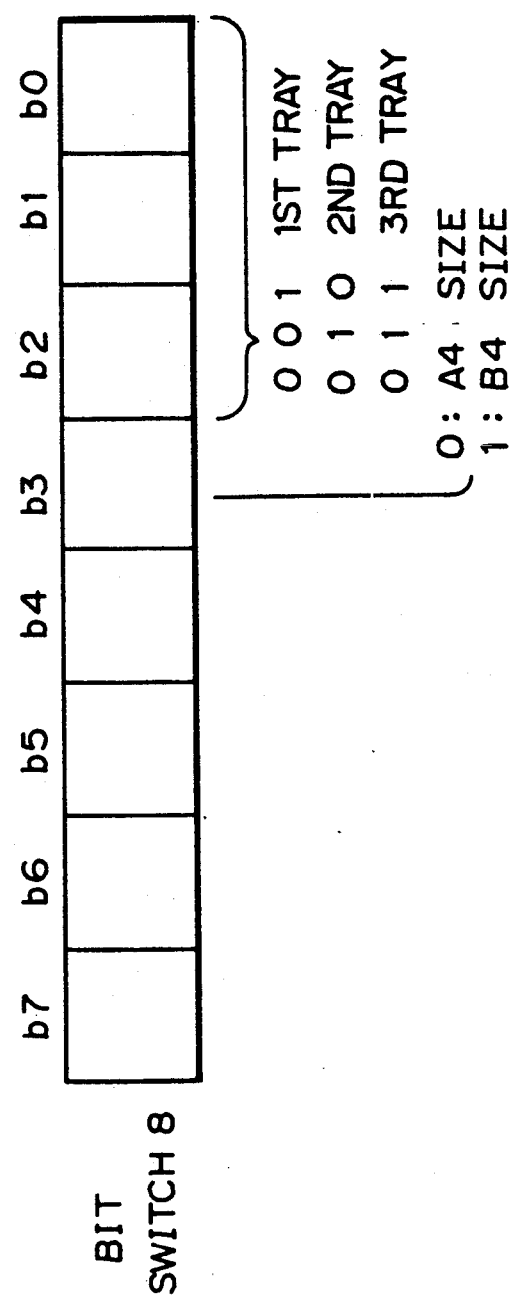

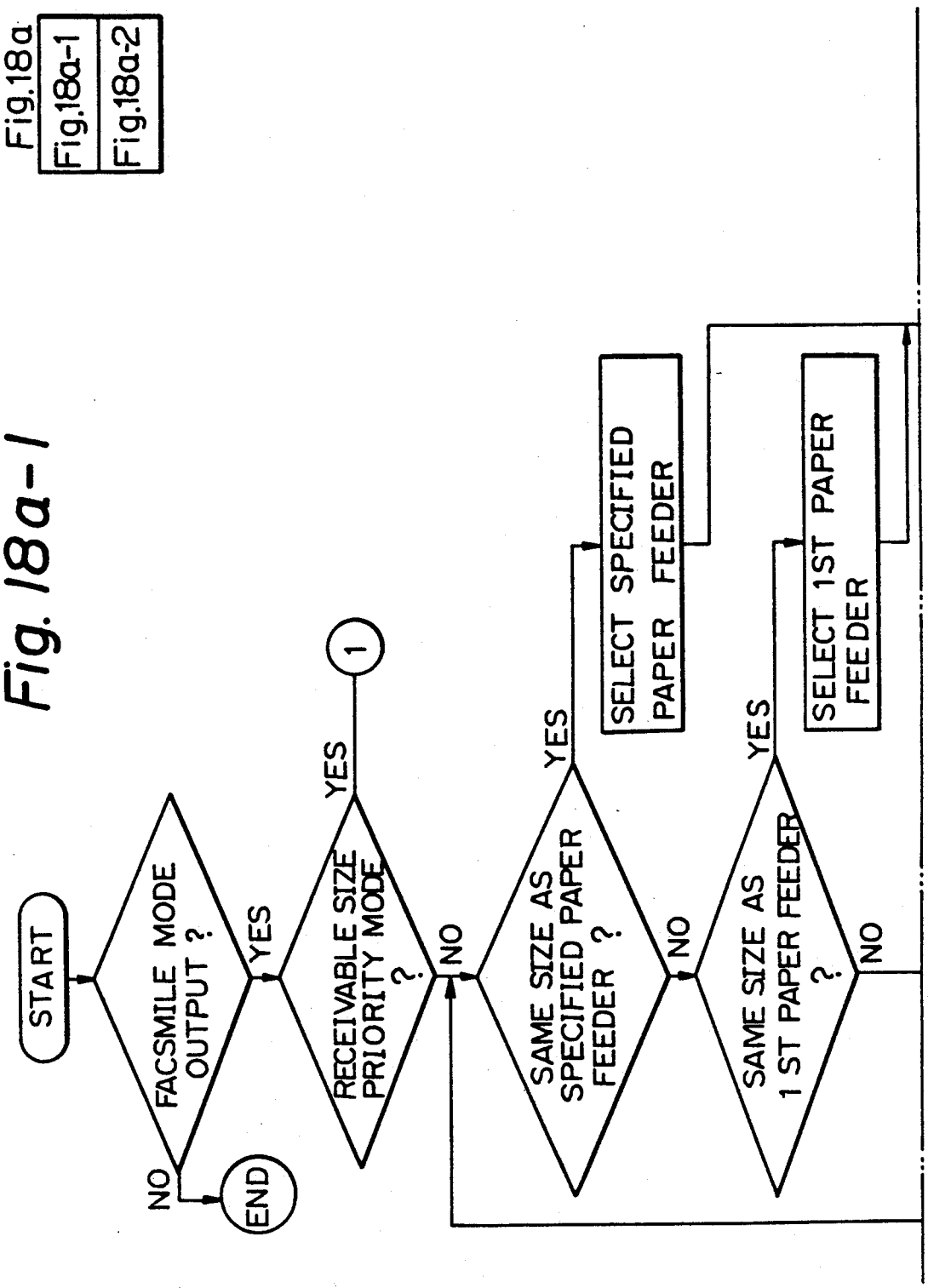

Fig. 21
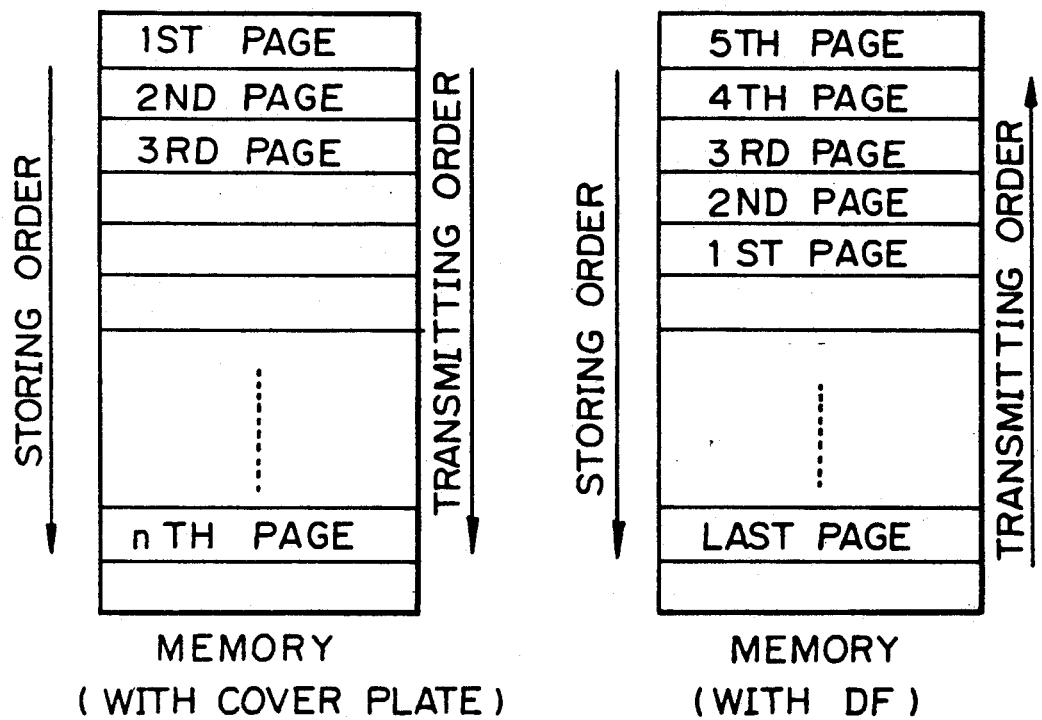
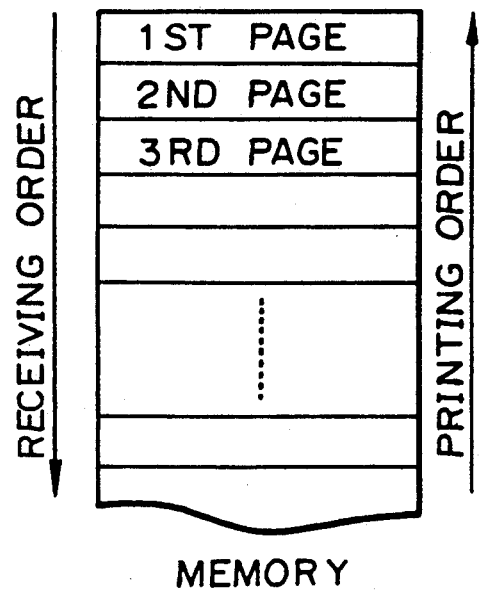

Fig. 25

```
USER'S NAME:
T E L  No.

**************************************
***SERVICE MONITOR REPORT ('85.04.12 15:17) : 0462231376P  *******
**************************************

DATE   START   DESTINATION   COM.MODE   QUICK SERVICE CODE   DEPARTMENT
04.12  15:15   K"***        631        0-07                 0001

**************************************
**************************************

MACHINE DATA

MEMORY CAPACITY              50 %
TOTAL NUMBER                 12345
FIX TEMPERATURE              180 °C
DRUM TEMPERATURE             35 °C
MAIN MOTOR OPERATING TIME    1000 H
```

Fig.29a PRINT KEY
Fig.29b READING FROM IMAGE MEMORY
Fig.29c FEED ROLLER
Fig.29d REGISTER ROLLER
Fig.29e TRANSPORT SECTION
Fig.29f DISCHARGE ROLLER
Fig.29g SELECTOR 315e
Fig.29h SELECTOR 315f

DIGITAL COPIER WITH A FACSIMILE FUNCTION

This application is a continuation of application Ser. No. 07/191,579 filed on May 9, 1988, now abandoned.

BACKGROUND OF THE INVENTION

The present invention relates to a digital copier having a facsimile transmission and reception capability.

A recent achievement in the imaging art is a digital copier which is the combination of a document reader which digitally reads the image of an original document and laser printer or like page printer which records images page by page with predetermined resolution. This kind of copier has a capability of reproducing images in an edited condition and a capability of processing images themselves as well as a usual copying capability. Further, a digital copier may serve as an output unit of a personal computer or like data processing device for producing hard copies or may even by provided with a communication function to serve as a facsimile terminal.

A predominant type of facsimile apparatus is equipped with a paper in the form of a roll for recording received data and accommodates only a single roll of a particular size at a time. Assuming that this type of facsimile apparatus is loaded with a paper of A4 size only, received image size may be successfully printed out on the paper if the image size is A4, but they have to be reduced before printed out if the image size is B4. Conversely, when the paper loaded in the facsimile apparatus is of B4 size, received images of A4 and B4 sizes may be recorded by ×1 magnification. In this case, however, recording a received image of A4 size on the B4 paper by ×1 magnification would leave a substantial blank area on the paper which is undesirable from the filing standpoint.

In light of this, there has been proposed a facsimile apparatus which can be loaded with papers of a plurality of sizes (usually two sizes) at a time. When this kind of apparatus is loaded with papers of A4 and B4 sizes by way of example, a received image of A4 or smaller size is printed out on the A4 paper by ×1 magnification, a received image of B4 size is printed out on the B4 paper by ×1 magnification, and a received image of a size larger than B4 is printed out on the B4 paper in a reduced scale. When a person desires to receive images with the A4 paper only, he or she may not mount the B4 paper.

Generally, a digital copier includes a photoelectric transducer such as one implemented with charge coupled devices (CCD) which is adapted to read a document laid on a glass platen. An image signal outputted by the transducer drives laser optics or like digital optics, whereby a photoconductive drum is exposed imagewise to reproduce the document by electrophotography. When the image signal is applied to a MODEM in place of the optics, the copier turns into a facsimile apparatus. In a receive mode, an image signal applied to the MODEM is fed to the optics. A digital copier, therefore, is capable of serving both of the copying function and the facsimile data receiving and transmitting function if provided with a MODEM and some signal switching means. A digital copier which is originally a copier is provided with a plurality of cassettes each being loaded with cut papers of a different size and removable from a housing of the copier. The housing is formed with a plurality of openings each being capable of accommodating any of the cassettes with no regard to the paper size.

Now, a facsimile apparatus compresses data to be transmitted. When only papers of A4 size are available at a receive station, the facsimile apparatus cannot transmit an image of B4 size unless it performs reduction in addition to compression. Although an image may be transmitted without being reduced and printed out at a receive station in a reduced scale, transmitting an image after reducing it at a transmit station halves the transmission time compared to transmitting it without reduction. Specifically, should only the papers of size A4 be available at the receive station, the image would eventually be reduced at the receive station. Another possible approach is transmitting all the images of sizes larger than A4 after reducing them to A4 so that they may be printed out in an enlarged scale at a receive station. This approach, however, has a drawback that the image quality is degraded because an image is reduced and then enlarged. To cope with this problem, according to the CCITT protocol, a receive station informs a transmit station of a paper size which is available there so that the transmit station may select a ×1 magnification mode or a reduction mode on the basis of the paper size reported and the image size to be transmitted. The previously mentioned type of apparatus which accommodates only a single paper size sends size data by protocol, and the apparatus with which two different paper sizes are usable at a time sends one of the paper sizes which is larger than the other. Assuming that the apparatus is loaded with papers of A4 and B4 sizes and that the B4 size is delivered as size data, then a transmit station sends images smaller than A4 size by ×1 magnification while a receive satin prints out images smaller than A4 on the A4 papers and B4 images on the B4 papers.

In the case that the apparatus which is originally designed as a copier is provided with a MODEM and other extra elements to bifunctional as a facsimile terminal, the cassettes, i.e., papers loaded in the apparatus are initially prepared for a copying purpose. In a receive mode, so long as the largest paper size is transmitted as size data to a transmit station, images of all the sizes can be received by ×1 magnification only if a cassette loaded with A3 papers is mounted in any of the openings of the copier housing. This, however, is inconvenient for those users who desire to uniformize the size of received images for easy filing and other purposes, as stated earlier. For example, when a user intends to limit the size of received images to A4, the user has to remove the other cassettes which are loaded with B4 and A3 papers in the event of facsimile reception. Specifically, every time the user desires to copy an original document on a paper of B4 of A3 size, he or she has to mount the B4 or A3 cassette and then remove it after copying. This is because the time of reception of facsimile data cannot be predicted. Indeed, facsimile data may be received while a copying operation is under way with papers of B4 size (they can be received because the MODEM is idle during copying operation). In such a condition, the B4 size which is not the true largest size is sent to a transmit station as size data.

SUMMARY OF THE INVENTION

It is therefore an object of the present invention to eliminate the drawbacks particular to the prior art apparatus as discussed above.

It is another object of the present invention to provide a digital copier with a facsimile function which allows reception sizes which meet various user's needs to be set up with ease while allowing papers of a plurality of sizes to be loaded at a time.

It is another object of the present invention to provide a generally improved digital copier with a facsimile function.

An image forming apparatus of the present invention comprises a plurality of paper feed sections in each of which a paper cassette may be mounted, paper size sensing means for sensing sizes of papers which are loaded in the paper cassettes which are mounted in the paper feed sections, paper feed section selecting means for specifying one of the paper feed sections, and setting means for setting to a reception size the size of papers loaded in the paper cassette which is mounted in any of the paper feed sections which is selected by the paper feed section selecting means.

BRIEF DESCRIPTION OF THE DRAWINGS

The above and other objects, features and advantages of the present invention will become more apparent from the following detailed description taken with the accompanying drawings in which:

FIG. 7 is a diagram showing an exemplary format of a transmission control signal;

FIG. 16 is a diagram showing information which may be indicated by a bit switch;

FIGS. 21a to 21c each showing an arrangement of papers in an image memory;

FIG. 25 shows an exemplary report which may be transmitted to a remote maintenance firm to show the location of an error;

FIGS. 29a to 29h are timing charts associated with a two-side output mode which is adapted for received data.

DESCRIPTION OF THE PREFERRED EMBODIMENT

Figure 1:
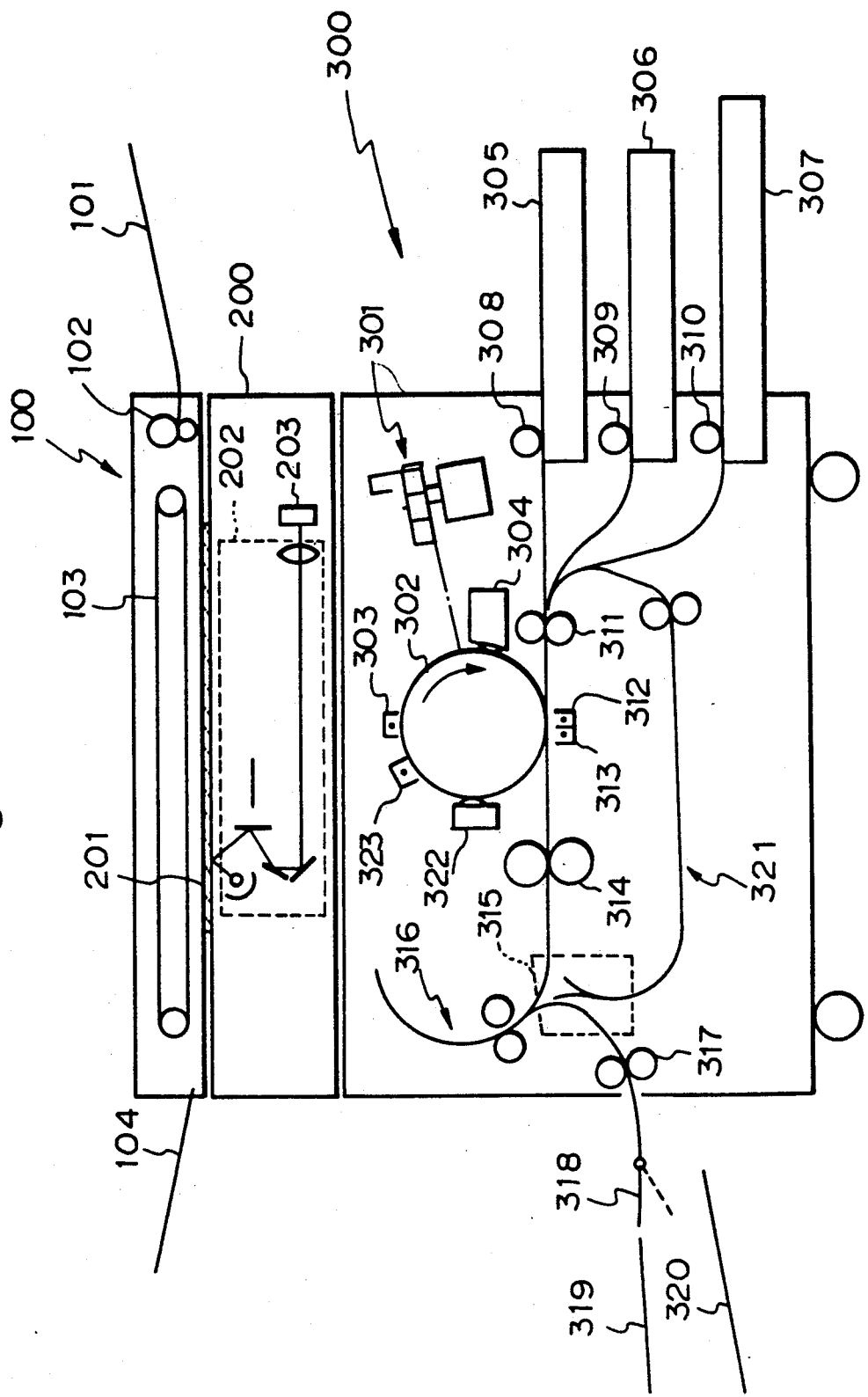
FIG. 1 is a schematic view of a digital copier with a facsimile function embodying the present invention.

Referring to FIG. 1 of the drawings, a digital copier with a facsimile function embodying the present invention is shown. As shown, the copier generally comprises a document transporting device 100, a scanner 200, and a copying device 300. The document transporting device 100 transports an original document to and from a glass platen 201. The scanner 200 decomposes an image of the document which is positioned on the glass platen 201 with a predetermined resolution so as to photoelectrically convert it. The copying device 300 records the image read by the scanner 200 on a paper which is fed from any of three cassettes which will be described, the section 300 having a two-side copying capability. Basically, such a construction is identical with that of a digital copier known in the art.

The document transporting device 100 includes a feed tray 101 which may be loaded with a stack of documents. The documents are sequentially fed from a tray by a feed roller 102 and then conveyed by a belt 103 to a predetermined position on the glass platen 201. After the image of the document has been read by the scanner 200, the document is fed out from the glass platen 201 by the belt 103 to reach a discharge tray 104.

The scanner 200 includes optics 202 which scans the document on the glass platen in a direction indicated by an arrow in FIG. 1. The image produced by such scanning, i.e., scanning light is incident to a line image sensor 203. In response, the line image sensor 203 decomposes the scanning light from the optics 202 into a predetermined number of pixels and photoelectrically converts the image on a pixel basis to produce electrical image data. The resolution of the scanner 200 is 15.4 dots per millimeter in the main scanning direction and 15.4 lines per millimeter (400 dots per inch) in the subscanning direction. This resolution is higher than the standard resolution (3.85 dots per millimeters in the main scanning direction and 7.71 lines per millimeter in the subscanning direction) by two times in the main scanning direction and by four times in the subscanning direction, and it is even higher than the high resolution (7.7 dots per millimeter in the main scanning direction and 7.7 lines per millimeter in the subscanning direction) by two times in both of the main and subscanning directions.

The copying device 300 includes a writing section 301 which modulates a laser beam by the image data. The modulated laser beam issuing from the writing section 301 scans a photoconductive element 302 which is in the form of a drum. The copying section 301 has the same resolution as the scanner 200. The drum 302 is rotated as indicated by an arrow while being uniformly charged by a charger 303. Scanning the drum 302, the laser beam forces an electrostatic latent image associated with the image data on the drum surface. The latent image is developed by a developing unit 304 to become a toner image. Three cassettes 305, 306 and 307 are each loaded with a stack of papers while feed rollers 308, 309 and 310 are associated with the cassettes 305, 306 and 307 respectively. The papers in a particular one of the cassettes 305, 306 and 307 are fed one by one by the associated feed roller 308, 309 or 310. Then, the paper is driven by a register roller 311 toward the drum at such a timing that its leading edge coincides with the leading edge of the toner image.

As the paper is brought into close contact with the drum 302 by a transfer charger 312, the toner image is transferred from the drum 302 to the paper. The paper carrying the toner image thereon is separated from the drum 302 by a separating charger 313, then advanced to a fixing unit 314 to fix the toner image, and then fed out of the copier by a discharge roller 317 via a distributing section 315 and an inverting section 316. Outside the copier, the paper is delivered by a sorter 318 to either one of stackers 319 and 320 which are respectively adapted to stack papers recorded with copy data and those recorded with received facsimile data. The distributing section 315 is adapted to distribute the paper which is recorded with an image to the inverting section 316, the discharge roller 317 or a transporting section 321. The transporting section 321 joins in a two-side copying operation by transporting a paper which carries a toner image on the first surface thereof to the register roller 311 again.

A cleaning unit 322 is provided for removing that part of toner which remains on the drum 302 after the transfer of the toner image. Further, a lamp 323 is provided for removing the charge which remains on the drum 302.

Figure 2:
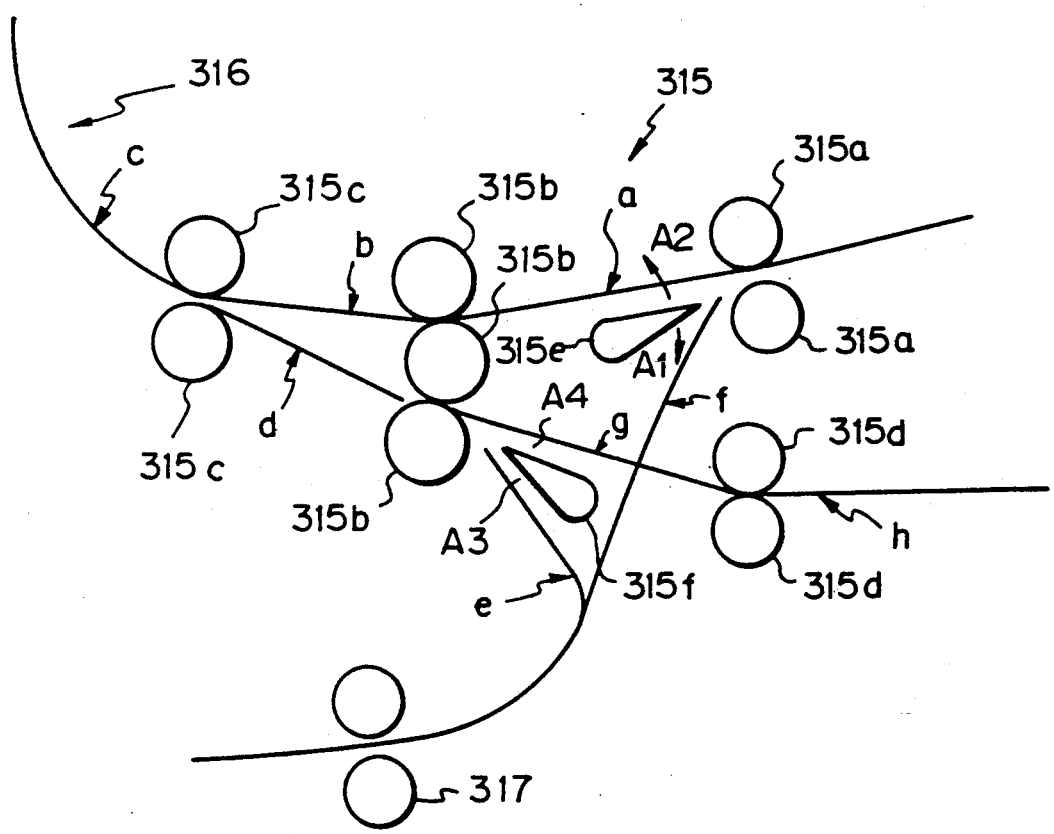
FIG. 2 is a schematic view showing a specific construction of an inverting mechanism which is installed in the copier of FIG. 1.

FIG. 2 shows a specific construction of the distributing section 315. As shown, the distribution section 315 includes rollers 315a, 315b, 315c and 315d for driving a paper, and selectors 315e and 315f each adapted to switch a paper transport path. When a paper is to be discharged with its recorded surface facing downward, i.e., in an inverted position, the selectors 315e and 315f are urged in directions A1 and A3, respectively. In this condition, the paper is guided through the path a→b→c→d→e to be fed out by the roller 317 to the outside. On the other hand, when the paper is to be discharged with its recorded surface facing upward, i.e. in a non-inverted position, the selector 315 is urged in a direction A2. This causes the paper to follow a path f to reach the discharge roller 312. Further, when the selector 315e is urged in a direction A1 and the selector 315f in a direction A4, the paper is guided to the transporting section 321 through a path a→b→c→d→g→h.

Figure 3:
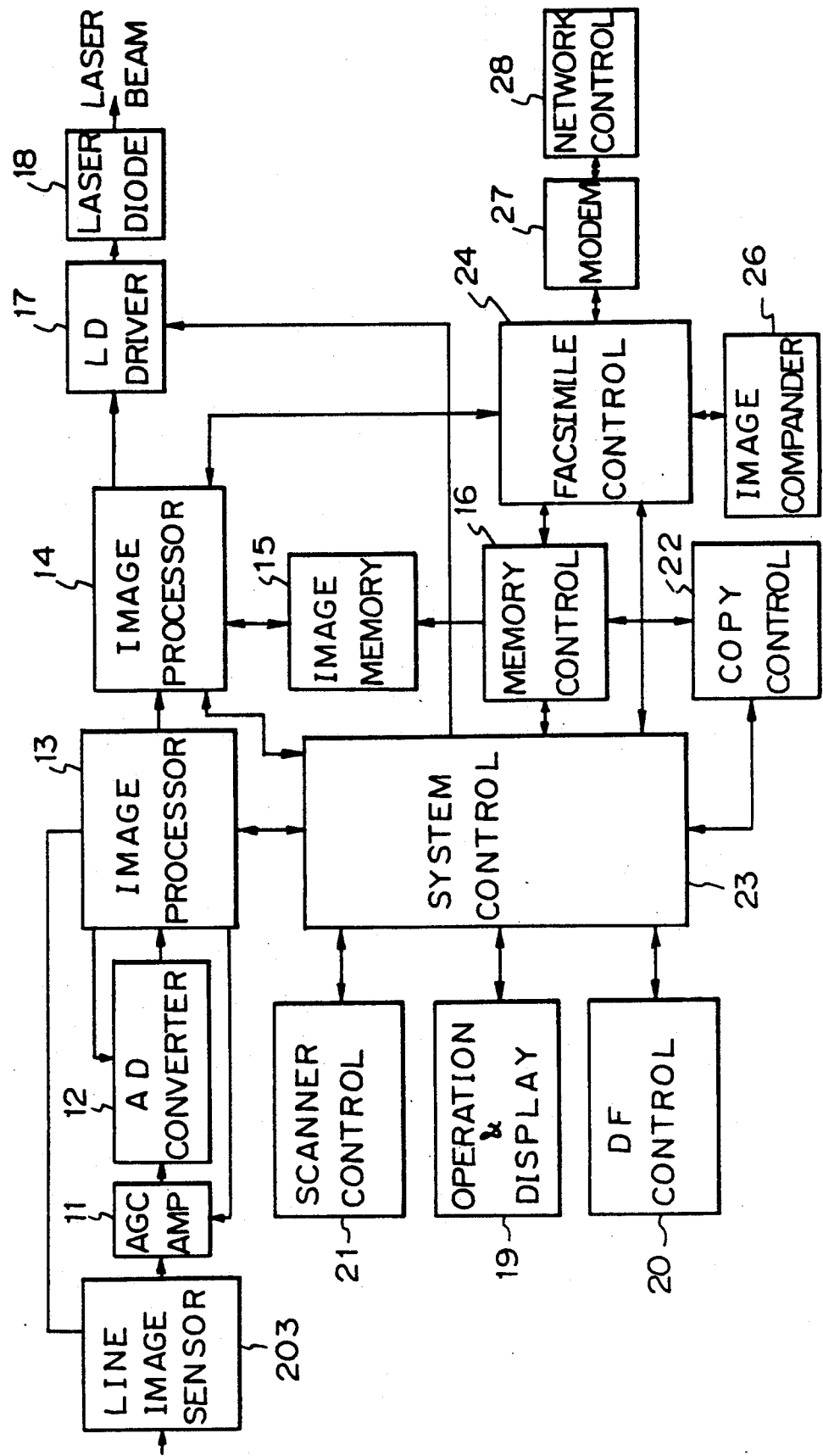
FIG. 3 is a block diagram showing a specific construction of a control system.

Referring to FIG. 3, a specific arrangement of a control system installed in the copier is shown. The output image signal of the line image sensor 203 is amplified by an automatic gain control (AGC) amplifier 11 to a predetermined amplitude, then converted by an analog-to-digital (AD) converter 12 into a digital signal having a predetermined number of bits, and then applied to an image processor 13. The image processor 13 implements various kinds of image processing such as shading correction for compensating for the irregularity in the level of image signal which is ascribable to the scattering of the characteristic of the optics 202 and that of the sensitivity of the individual bits of the line image sensor 203 to light; $\gamma$ correction for compensating for the difference between the reading characteristic of the scanner 200 and the actual visual sensation to thereby render an image read by the scanner 200 optimal to the eye; MTF correction for eliminating the blur of an image; background erasure for adequately extracting image from a newspaper or like document having a relatively dark background and a document whose background is smeared; halftone processing for falsely providing an image with tones; and character/halftone separation for separating a character portion to be subjected to bilevel processing and a picture portion to be subjected to halftone processing.

The image data coming out of the image processor 13 are applied to another image processor 14 which is adapted to compress them by using the most efficient system. The compressed data from the image processor 14 are stored in an image memory 15 whose capacity is great enough to store, for example, twenty to sixty standard papers in terms of the amount of compressed data. Data are written in and read out of the image memory 15 under the control of a memory control 16. The image data read out of the image memory 15 are converted into the original image signal by the image processor 15. The resulting image signal is fed to a laser diode driver 17 with the result that a laser diode 18 emits a laser beam which has been modulated by the image signal (image data). The laser diode 18 is installed in the writing section 301 of the copying device 300. Other functions assigned to the image processor 14 are density conversion processing for converting the line density of an image and magnification change processing for enlarging and reducing an image as desired.

An operation and display section 19 includes various keys which are accessible for selectively operating the copier as a copier and a facsimile terminal, and a display for showing operating conditions of the facsimile terminal, operating procedures, etc. The keys include a start key for starting the transmission of facsimile data, a copy key for starting a copying operation, a stop key for interrupting it, numeral keys for entering numerical values representative of a desired number of copies, a telephone number and the like, an abbreviation key for entering abbreviated telephone numbers, mode keys for selecting various operations modes of the facsimile terminal, and guidance keys for selecting items which may appear on the display. The display is implemented by a liquid crystal display or the like having inherently great freedom of display and displays a numerical value entered on the numeral keys, the actual number of copies produced, etc. A document feeder (DF) control 20 controls the document transporting device 100, a scanner control 21 controls the scanner 200, and a copy control 22 controls the operations of various portions of the copying device 200. A system control 23 is provided for controlling the operation timings, operation modes and others of the DF control 20, scanner control 21, copy control 22, image processor 13, memory control 16, and laser diode driver 17. The memory control 16 and the copy control 22 interchange data which are adapted to synchronize the operation of the writing section 301.

The facsimile control 24 executes a transmission control procedure for the transmission of facsimile data and controls an image compander 26, a MODEM 27 and a network control 28 for executing the transmission and reception of image data. The facsimile control 24 interchanges control data with the system control 23 and memory control 16. Having a companding capability which accommodates some different code compression systems, the image compander 26 compresses an image to be transmitted and expands a received image to produce an original image signal. The MODEM 27 modulates digital data into a wave-form which can be transmitted over an analog channel and demodulates a received signal into original digital data, the MODEM 27 being capable of executing some different modulation and demodulation systems. For example, the MODEM 27 is constituted by units which implement modulation and demodulations in for example a G1, a G2 or a G3 facsimile mode. The network control 28 serves to connect the facsimile terminal to the transmission channel (in this case, a public telephone network) and has an automatic transmission and reception capability. The data entered on the operation and display section 19 are reported to the facsimile control 24 via the system control 23. The display data from the facsimile control 24 to the operation and display section 19 are fed to the section 19 via the system control 23. Further, the control data from the facsimile control 24 to the image processors 13 and 14 are also outputted via the system control.

In a two-side copy mode, the operator stacks desired two or more original documents on the feed tray 101 of the document transporting device 100, then selects a two-side copy mode on the operation and display section 19, then selects a paper size which matches with the documents, and then, if a plurality of copies are desired, enters the number of copies on the numeral keys. As the operator presses a print key (see FIG. 4a), the system control 23 commands the DF control 20 the feed of the first document. The DF control 20 causes the document transporting device 100 to feed the first document to a predetermined position on the glass platen 201 (see FIG. 4b). Upon completion of the transport, the DF control 20 notifies the system control 23 of the end of transport. In response, the system control 23 causes the scanner control 21 to start reading an image of the document and, at the same time, informs the copy control 22 of the paper size selected. Then, the copy control 22 feeds a paper of the particular size to form an image thereon.

The scanner 200 drives the optics 202 in the main scanning direction while, at the same time, the line image sensor 203 is operated to read the first document. As the optics 201 completes the the first reading stroke, it is returned to its original position (see FIG. 4c). Simultaneously, the copy control 22 actuates the feed roller 305a (see FIG. 4f) to feed one paper so as to execute a predetermined image forming process (see FIG. 4g). The image signal outputted by the line image sensor 203 is processed by the image processor 13, then compressed by the image processor 14, and then stored in the image memory 15 (see FIG. 4d). In parallel with the storage of the compressed data in the image memory 15, the image signal before the storage is routed to the laser diode drive 17. As a result, the first document is reproduced on the first surface of the paper. At this instant, the selector 315e has been urged in the direction A1 (see FIG. 4j) and the selector 315f in the direction A3 (see FIG. 4k). Hence, the paper carrying the image on its first surface is guided by the distributing section 315 to the inverting section 316 and again guided by the section 315 to the transporting section 321. The section 315 moves the paper to a position just before the register roller 311 (see FIG. 4h).

Figure 4:
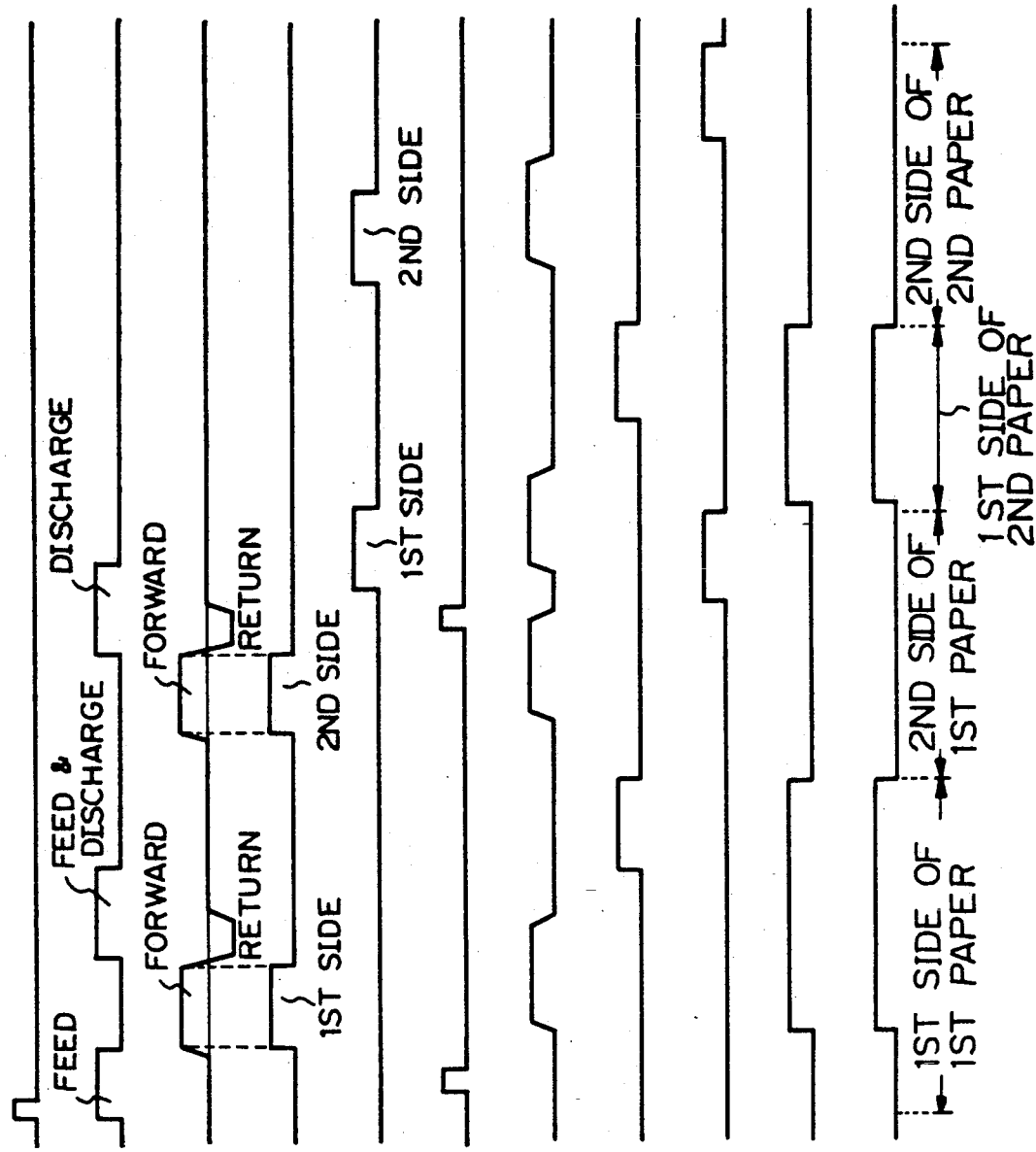
FIGS. 4a to 4k and 5a to 5k are wave-form diagrams representative of the operation of various sections which occur in a two-side copy mode.
Figure 5:
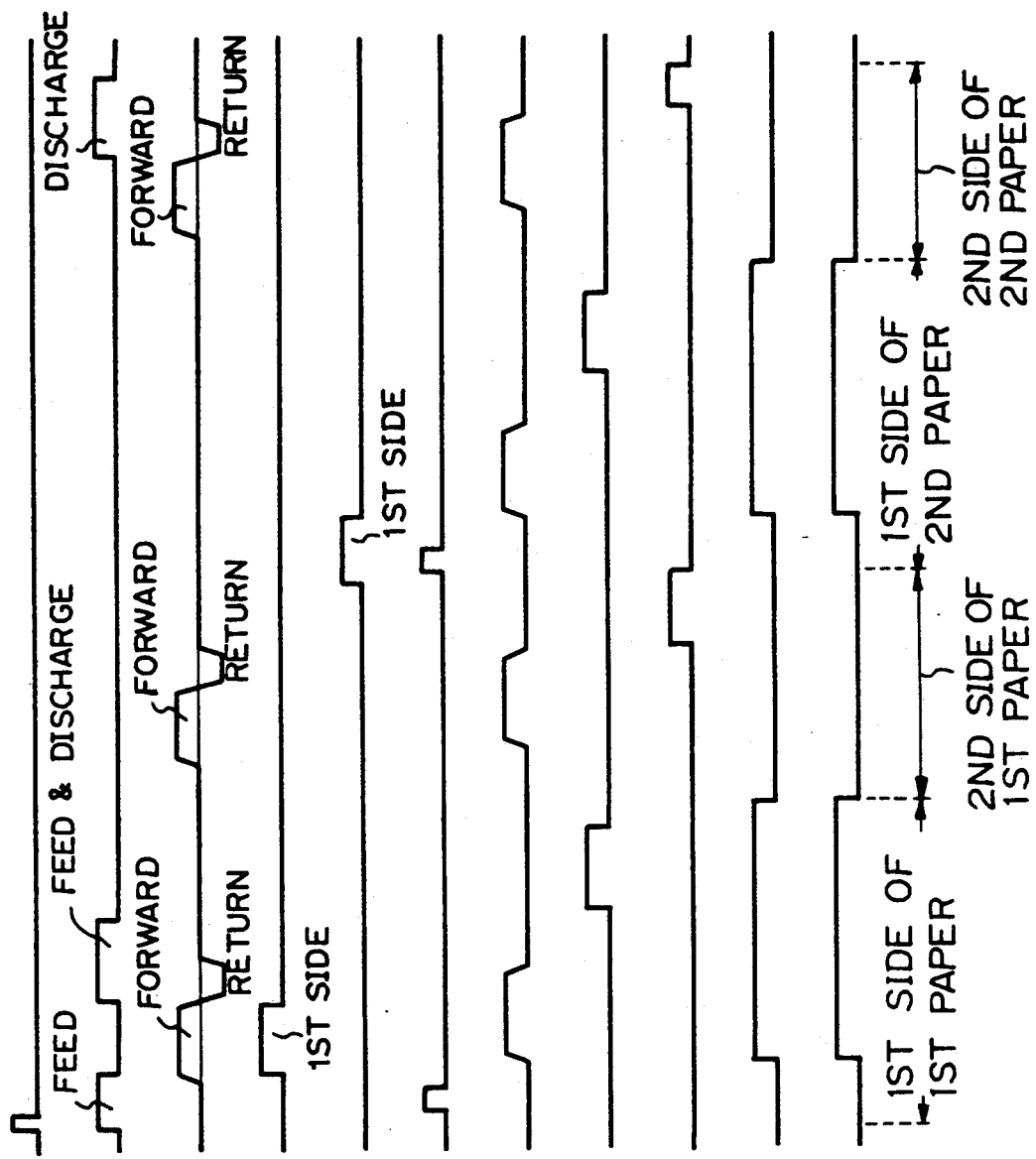

The DF control 20 feeds out the first document when the latter is fully read while, at the same time, transporting the second document to the glass platen 201. Hence, at the instant when the paper carrying the image on its first surface is positioned by the register roller 311 again, the second document has been positioned on the glass platen 201. In this condition, the system control 23 causes the scanner driver 21 to start reading the second document while, at the same time, commanding the copy control 22 the reproduction of the document on the paper which is waiting at the position just in front of the register roller 311. At this time, the image signal from the line image sensor 203 of the scanner 200 is processed by the image processor 13 and then directly fed to the laser diode driver 17 via the image processor 14. That is, the image data associated with the image which is to be recorded on the second surface of the paper are not written in the image memory 15. As a result, the image of the second document is recorded on the back (i.e. second surface) of the paper. In this case, the selectors 315e and 315f are urged in the directions A2 and A4, respectively, so that the paper carrying images on both surfaces thereof is driven to the discharge roller 312 via the distributing section 315, inverting section 316 and again distributing section 315. The discharge roller 312 feeds the paper out of the copier (FIG. 4i).

By the above-described procedure, a single paper which is recorded with images on both sides thereof is produced.

When the number of desired copies is two or more, the system control 23 reads the data out of the image memory 15 to print them out on the first surface (see FIG. 4e) and, since the second document has been located on the glass platen 201 then, reads it to produce the resulting image on the second surface. As the desired number of copies are produced, the system control 23 causes the DF control 20 to feed out the document which is laid on the glass platen 201. In this manner, the first document is stored in the image memory 1, the second document is held on the glass platen 201, the document stored in the image memory 1 is read out for the first surface of the second paper and onward, and the document read by the scanner 200 is used for the second surface. This eliminates the need for storing the paper which is recorded with the first document image within the copier.

If the image memory 15 has a capacity great enough to accommodate a plurality of document images, both the image to be recorded on the first surface and the image to be recorded on the second surface may be stored in the image memory 15. In such a case, various sections stated above will be operated as shown in FIGS. 5a to 5k. Specifically, an image signal derived from the second document is also stored in the image memory 15 while, at the same time, a non-compressed image signal is applied to the laser diode driver 17. This reduces the period of time necessary for a two-side copying operation to be completed. The other operations are the same as those which have been described with reference to FIGS. 4a to 4k and, therefore, will not be described to avoid redundancy.

Hereinafter will be described the facsimile function which is available with the copier of the present invention.

Figure 6:
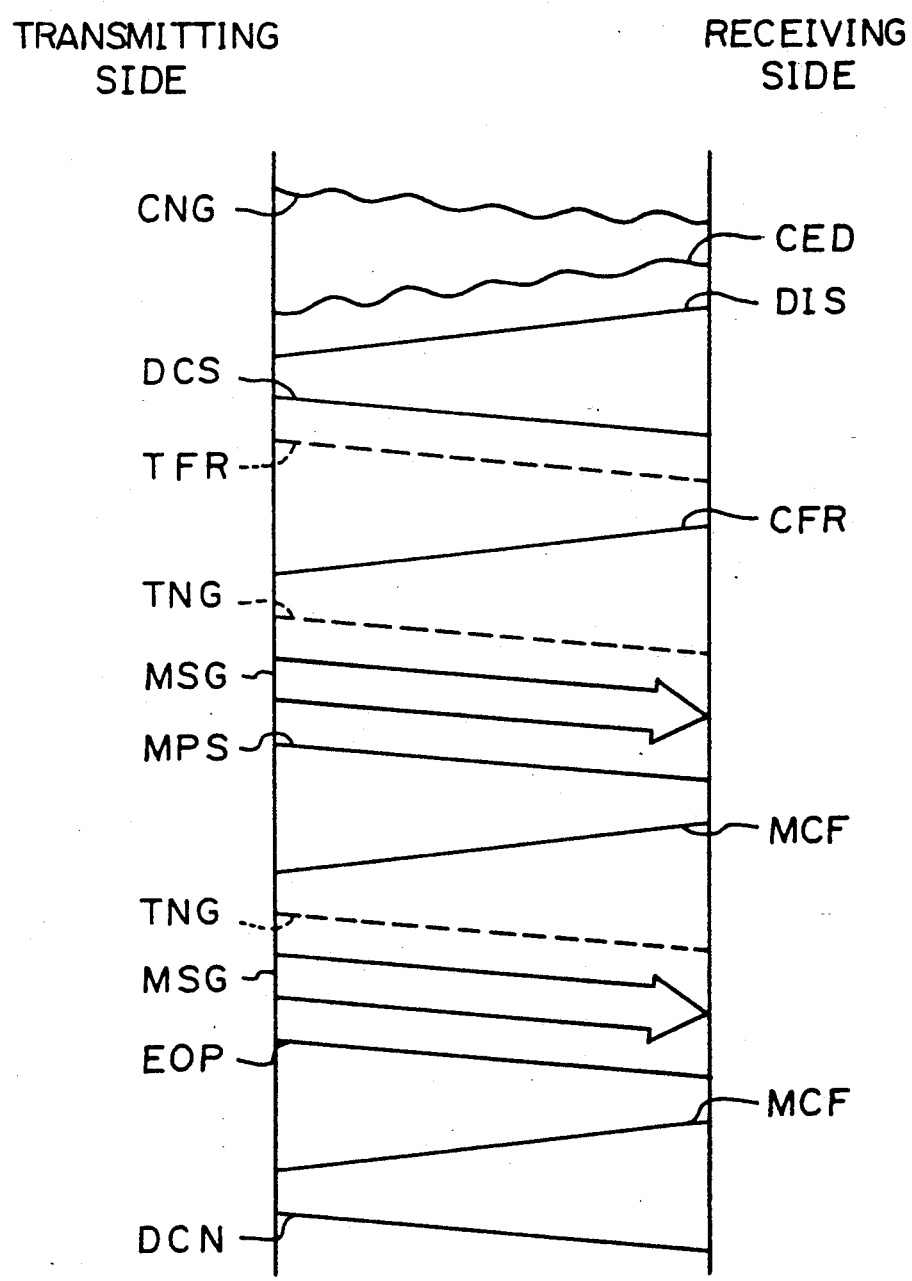
FIG. 6 is a timing chart demonstrating an exemplary facsimile transmission procedure.

FIG. 6 shows an exemplary facsimile transmission procedure. As shown, when a transmit station calls a receive station (CNG of a call signal) to set up a line, the receive station returns a called station identification signal CED representative of a non-voice terminal and then a digital identification signal DIS representative of the own receiving functions to the transmit station. In response, the transmit station selects particular facsimile transmission functions on the basis of the signal DIS, informs the receive station of those functions by indicating them in a digital command signal DCS, and executes training for 1.5 seconds (training check TCF) by setting the MODEM rate to the transmission rate selected. If the result of MODEM training is acceptable, the receive station sends a confirm-to-receive signal CFR to the transmit station and enters into the preparation for the reception of an image at the MODEM rate of that instant.

Upon reception of the signal CFR, the transmit station sends to the receive station a training signal TNG which is associated with the MODEM training sequence of the standard which is associated with the MODEM rate selected. Then, the transmit station sends an image signal MSG representative of the first page, and, if any other page follows, sends a multipage signal MPS. When the receive station succeeds in adequately receiving the image, it returns a message confirmation signal MCF to the transmit station and prepares for the "01111110", the address portion is a bit sequence of "11111111" of a global address which is representative of an unspecified addressee, the control portion C is a bit sequence of "1100X000(X being "0" in a non-final frame and "1" in the final frame) representative of a non-numbered frame, the facsimile control portion FC is a bit sequence representative of each transmission control procedure signal, the facsimile data portion FI is a bit sequence representative of parameters of those transmission control procedure signals which are accompanied by parameters (DIS, DCS, DTC, NSS, NSF, etc.), and the flag check sequence FCS is a bit sequence of CRC (Cyclic Redundancy Check) code produced by applying a predetermined polynomial to the bit sequences of the address portion A to the facsimile data portion FI.

Examples of the facsimile data portion FI are shown in Table below.

TABLE 1

| BIT NO. | DIS/DTC | DCS |
|---|---|---|
| 1 | transmitter - T.2 operation (G1) | |
| 2 | receiver - T.2 operation (G1) | receiver - T.2 operation (G1) |
| 3 | T.2IOC = 176 | |
| 4 | transmitter - T.3 operation (G2) | |
| 5 | receiver - T.3 operation (G2) | receiver - T.3 operation (G2) |
| 6 | save for T.3 | |
| 7 | same as above | |
| 8 | same as above | |
| 9 | transmitter - T.4 operation (G3) | |
| 10 | receiver - T.4 operation (G3) | receiver - T.4 operation (G3) |
| 11, 12 | data signaling rate | data signaling rate |
| 13 | save for new modulation system | |
| 14 | same as above | |
| 15 | vertical resolution = 7.7 l/mm | vertical resolution = 7.7 l/mm |
| 16 | two-dimensional coding ability | two-dimensional coding |
| 17 | max paper width of 256 mm (B4) | max paper width of 256 mm (B4) |
| 18 | max paper width of 297 mm (A3) | max paper width of 297 mm (A3) |
| 19 | max paper width of 364 mm (B4) | max paper width of 364 mm (B4) |
| 20 | no limitation on paper length | no limitation on paper length |
| 21, 22, | min scan line time per line | min scan line time per line |
| 23 | ability of receiver | |
| 24 | extension field | extension field | reception of the next page. In response to the signal MCF, the transmit station sends another training signal TNG, then sends the second page and, if the transmission is to be ended there, sends an end-of-procedure signal EOP. Again, the receive station returns a signal MCF. Then, the transmit station sends a disconnect signal CDN to disconnect the line, thereby ending the facsimile transmission. Upon reception of this signal CDN, the receive station disconnects the line.

By such a facsimile transmission procedure, images are transmitted. For the training check TCF and the transmission of image data, use is made of a 2400 to 9600 bps high-speed MODEM while, for the digital identification signal DIS and other transmission control procedure signals, use is made of a 300 bps low-speed MODEM. It is to be noted that the transmission control procedure signals mentioned above are a part of transmission control procedure signals which are prescribed in relation to the facsimile transmission procedure as recommended by CCITT Recommendation T.30.

Figure 7:
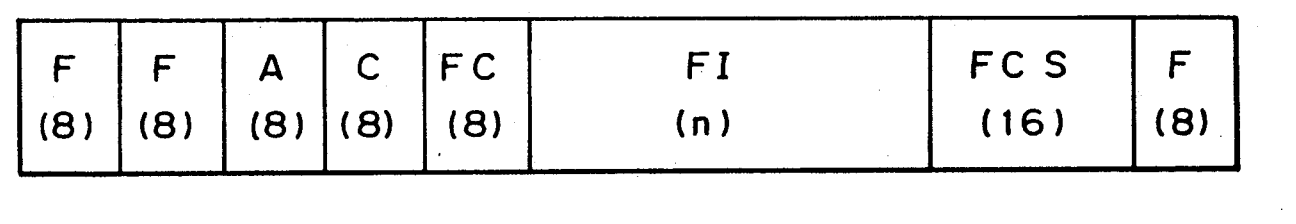

As shown in FIG. 7, the transmission control procedure signal basically has a frame particular to a HDLC (High-Level Data Link Control) procedure. Specifically, the signal is constituted by two 8-bit flag sequences F, an 8-bit address portion A, an 8-bit portion C, an 8-bit facsimile control portion FC, an n-bit facsimile data portion FI, a 16-bit flag check sequence FCS, and an 8-bit flag F. The flag F is a bit sequence of In the facsimile data field FI of the signals DIS and DTC, it is shown that the functions represented by those bit numbers which are "1" are available. In the facsimile data field FI of the signal DCS, it is shown that the functions represented by those bit numbers which are "1" are selected. Further, when the extension field indicated by the bit number 24 is "1", it is shown that an 8-bit extension field follows and therefore, the total number of bits of the facsimile data field FI is thirty-two.

Assume that the operator loads the feed tray 101 of the document transporting device 100 with a stack of documents, selects the facsimile mode on the operation and display section 19, enters a destination, and presses the start key to start transmitting the documents. Then, the system control 23 transfers the data keyed in to the facsimile control 24 to start the facsimile transmission while, at the same time, commanding the DF control 20 the transport of a document to the glass platen 202. Consequently, the transporting device 100 positions the document on the glass platen 202. The size of the document on the glass platen 202 is sensed and fed from the DF control 20 to the facsimile control 24 via the system control 23.

Assume that the operator selects an instantaneous transmission mode and selects one destination. Then, the facsimile control 24 transfers the destination's telephone number to the network control 28 to call the destination. As the line is established, the facsimile control 24 executes the previously stated transmission control procedure to identify the destination's receiving functions and then informs the destination of those of the receiving functions which it is to use. If the size of the document to be transmitted is different from the size available at the destination, i.e., receivable size, the document is transmitted after being changed in magnification. Table 2 shows a relationship between the receivable size, the size of a document to be transmitted, and the magnification ratio.

TABLE 2

| MAGNIFICATION CHANGE (%) | TRANSMIT DOCUMENT SIZE | RECEIVABLE SIZE |
| --- | --- | --- |
| 86 | A3 | B4 |
|  | A4 | B5 |
| 82 | B4 | A4 |
|  | B5 | A5 |
| 71 | A3 | A4 |
|  | B4 | B4 |
| 61 | A3 | B5 |
|  | A4 | B6 |
| 50 | A3 | A5 |
|  | B4 | B6 |
| 115 | B4 | A3 |
|  | B5 | A4 |
| 122 | A4 | B4 |
|  | A5 | B5 |
| 141 | A4 | A3 |
|  | B5 | B4 |

With an ordinary facsimile apparatus, papers of sizes other than A4 to A3 are rarely used. However, when it comes to a facsimile apparatus with which many kinds of papers may be used as in the illustrative embodiment, it sometimes occurs that papers are selected on the basis of papers actually loaded and, in such a case, such a wide range of magnification ratios may be selected. Then, the own functions will of course be reported to the other party in a pretransmission procedure by a non-standard terminal signal or the like, thereby informing the other party of all the papers usable.

Figure 8:
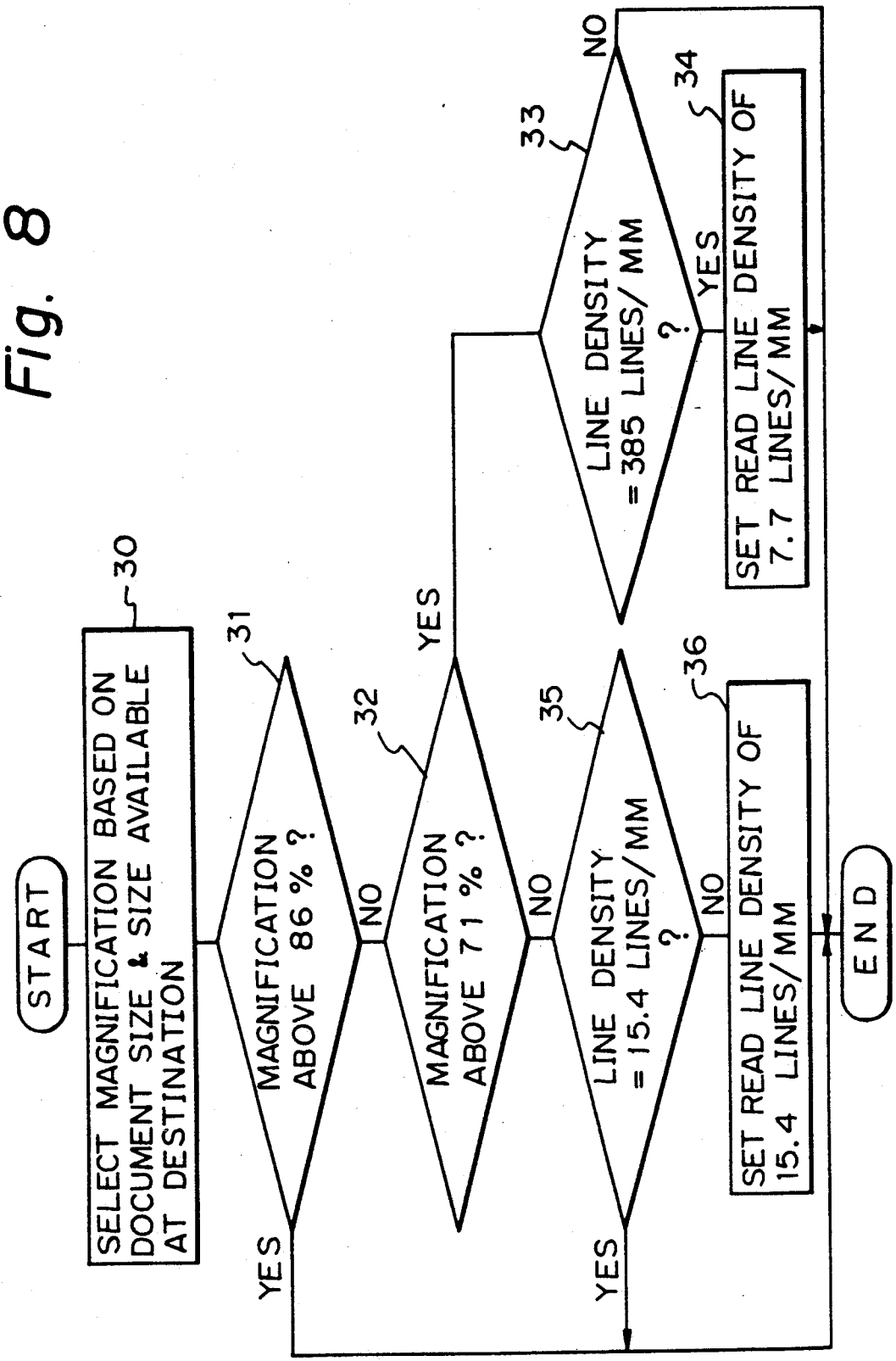
FIG. 8 is a flowchart showing an example of line density and magnification set processing in a transmit mode.

Excessively reducing the image of a transmit document would render the resulting image illegible and thereby critically degrade the image quality at the destination. In the light of this, the facsimile control 24 performs the processing shown in FIG. 8 so as to select a reading line density which matches with a particular magnification. In the processing of FIG. 8, the facsimile control section 24 selects a magnification based on the relationship of Table 2 (step 30), and sees if the magnification is above 86% (step 31). If the magnification is not above 86%, the facsimile control 24 determines whether the magnification is above 71% (step 32). If the answer is YES, the facsimile control 24 determines whether the reading line density set at that time is 3.85 lines per millimeter (step 33). If the result is YES, the line density is set to 7.7 lines per millimeter (step 34). If the result of the step 32 is NO, whether the line density has been set to 15.4 lines per millimeter is determined (step 35). If the answer is NO, the line density is set to 15.4 lines per millimeter (step 36).

In this manner, if the magnification is 71% to 86%, an image is read at a line density of at least higher than 7.7 lines per millimeter while, if it is below 71%, an image is red at a line density of 15.4 lines per millimeter. That is, the resolution is increased with the reduction ratio so that the degradation of a reduced image is minimized to allow small character and others which may appear on a received image to be surely recognized. The magnification and line density set as stated are reported to the image processor 14 via the system control 23. The image read by the scanner 200 at the resolution of 15.4 dots per millimeter in the main scanning direction and the resolution of 15.4 dots per millimeter in the subscanning direction is transferred to the facsimile control 24 via the image processors 13 and 14. The, the image is compressed by the image compander 26 by a particular coding system, then modulated by the MODEM 27 by a particular modulation system, and then sent to the destination via the network control 28.

As described above, so long as the instantaneous transmission mode is selected and the transmission is meant for only one destination, the image read is directly transferred to the facsimile control 24 and not stored in the image memory 15. Next, assume that the operator selects an appointment transmission mode in which a time for transmission is appointed and a multi-address transmission mode in which a plurality of addresses are designated. In this case, the image read by the scanner 200 is stored in the image memory 15 after being processed by the image processors 13 and 14. The time for transmission, the destinations and like data entered by the operator are stored in the facsimile control 24.

The image data are sequentially transmitted to the designated destinations when the appointed time is reached in the appointment transmission mode and when the image data are fully stored in the multi-address transmission mode. At this time, the facsimile control 24 selects a single destination or one of a plurality of destinations and transfers telephone number data associated with that destination to the network control 28 to call the destination. This is followed by the previously stated transmission control procedure and then by the processing of FIG. 8 to select a magnification and a line density based on the relationship between the document size and the receivable size. The magnification and line density selected so are loaded in the image processor 14.

To start the transmission of the image data, the facsimile control 24 delivers a command to the memory control 16 for sequentially reading the image data out of the image memory 15. At the same time, the facsimile control 24 causes the image processor 14 to select the facsimile control 24 via the system control 23. Consequently, the image data read out of the image memory 15 are restored by the image processor 14 to the original image signal and, after density conversion and magnification processing, applied to the facsimile control 24. The image signal applied to the facsimile control 24 is compressed by the image compander 26, then modulated by the MODEM 27, and then sent to the destination via the network control 28.

When a plurality of destinations are designated, the transmission of image data to the above-mentioned destination is followed by the sequential selection of the other destinations, and the same procedure is repeated until the transmission to the last destination completes. The image data fully transmitted in the image memory 15 are erased.

The operation which occurs in the event of facsimile reception is as follows.

Since the illustrative embodiment is basically operable as a copier, facsimile reception is implemented as an interruption to the copying operation of the copier. Therefore, informing a transmit station of the size of papers which are selected for a copying operation as receivable size would sometimes cause a trouble. In the illustrative embodiment, the receivable size is limited to a standard size such as A4 and reported to a transmit station by the pretransmission procedure. This receivable size may be entered on the operation and display section 19. A received image is once stored in the image memory 15 and, if the received image can be outputted for recording, it is outputted when one full page is received. If papers of the receivable size are not set and, instead, papers of B4 size are set, the received image is recorded on the B4 paper by ×1 magnification. If even the B4 papers are not set, a message which urges the operator to load A4 papers is produced on the operation and display section 19 and the image is not recorded. The size of papers to be selected next as mentioned may be entered on the operation and display section 19.

Assume that the reception of an image begins while the copying operation is under way. Then, the image being received is stored in the image memory 15 until substantially 80% of the capacity of the image memory 15 has been copied. As 80% of the memory capacity is reached, the copying operation under way is forcibly interrupted and the received image is read out of the image memory 15 to be recorded. This part of the image read out of the image memory 15 is erased and, when a predetermined part of the image memory 15 such as 90% becomes empty, the copying operation is resumed. At the instant when the copying operation is completed, the remaining part of the received image is recorded. The various copying parameters such as the paper size, the desired number of copies, the number of actually produced and the density are saved at the time of interruption, so that they may be set up again at the time of resumption. While recordings produced by the copying operation are distributed to the stacker 319, those carrying facsimile data are distributed to the stacker 320.

Figure 9:
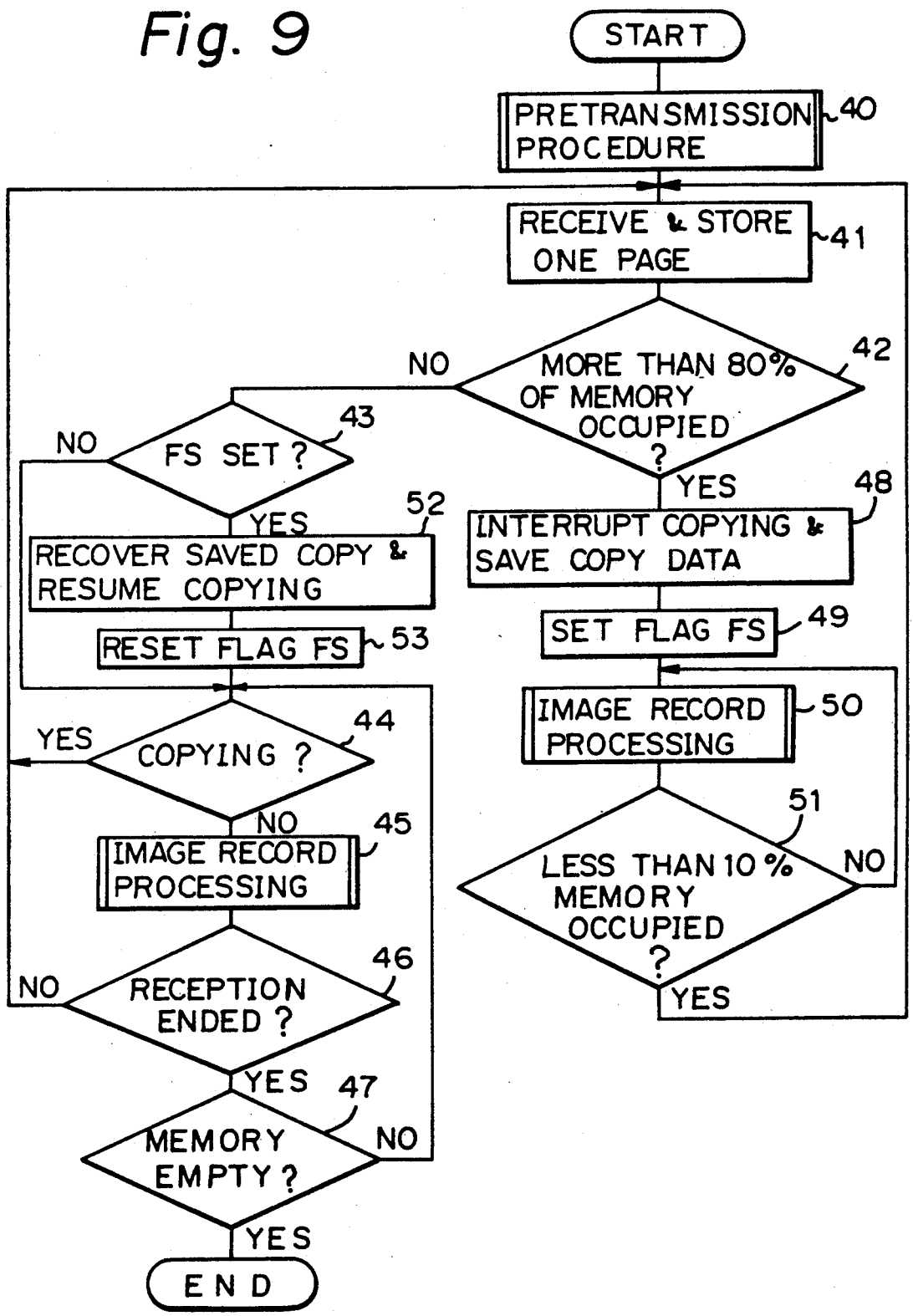
FIG. 9 is a flowchart showing an example of receive processing.

Referring to FIG. 9, an exemplary operation which occurs at the time of reception is shown. The facsimile control 24 executes a predetermined pretransmission procedure (step 40) and then sets a particular MODEM rate and a particular coding system selected at the step 40 in the MODEM 27 and the image compander 26, respectively. In this condition, the facsimile control 24 demodulates one page of image data received so as to recover the original image data. These data are fed to the image processor 14 and stored in the image memory 15 (step 41). If more than 80% of the capacity of the image memory 15 has been occupied (the answer of the step 42 is NO), the facsimile control 24 determines whether a flag FS representative of the interruption of a copying operation has been set (step 43) and if the answer of the step 43 is NO, whether a copying operation is under way (step 44). If the result is NO, image record processing 45 for recording one page of received image is executed. Then, the facsimile control 24 determines whether the reception has been completed (step 46) and, if the answer is NO, returns to the step 41. If the answer is YES, the facsimile control 24 sees if the image memory 15 has become empty (step 47), returning to the step 44 if the answer is NO and ending this routine if otherwise.

If the result of the step 42 is positive, the facsimile control 24 interrupts the copy processing, indicates the interruption on the operation and display section 19, saves the copy data (step 48), and executes an image recording step 50 which is identical with the step 45 after setting the flag FS (step 49). Then, the facsimile control 24 sees if 90% or more of the capacity of the image memory 15 is vacant (step 51), returning to the step 50 if the answer is NO and to the step 41 if otherwise. If the result of the decision 43 is YES, the facsimile control 24 recovers the saved data, shows the recovery on the operation and display section 19, resumes the copy processing (step 52), and resets the flag FS (step 53).

It follows that when a facsimile image is received while the copying operation is not performed, the result of the decision 42 which follows the steps 40 and 41 is NO, that of the decision 43 is NO, and that of the decision 44 is NO. Hence, one page of image received is immediately printed out by the step 45. Since the result of the decision 45 is still NO at the end of the step 45, the loop which begins at the step 41 is repeated until the reception has been completed. When the operator starts copying while the reception is under way, the result of the decision 44 becomes YES and the program returns to the sep 41 to prevent the received image from being printed out. In this condition, the image memory 15 is sequentially occupied every time one page of image is received.

As 80% of the capacity of the image memory 15 is occupied while the copying operation is continued, the result of the decision 42 becomes YES to interrupt the copying operation and sets the flag. The step 50 is repeated until more than 90% of the image memory 15 becomes vacant. Then, the proportion of the image memory 15 occupied at the end of reception and storage of the next page of image is less than 80%, so that the result of the decision 42 becomes NO. At the same time, the result of the decision 43 become YES and therefore, the copying operation is resumed with the flag FS reset. As the result of the decision 44 becomes NO at the end of the copying operation and if the reception is completed, all the remaining images received are printed out. If the reception is not completed, one page of received image is printed out and then the next page is received. Further, when the reception of facsimile data is started while the copying operation is performed, the first page and onward are sequentially stored in the image memory 15 and, when more than 80% of the image memory 15 is occupied or when the copying operation is completed, the data stored in the image memory 15 are sequentially printed out.

Figure 10:
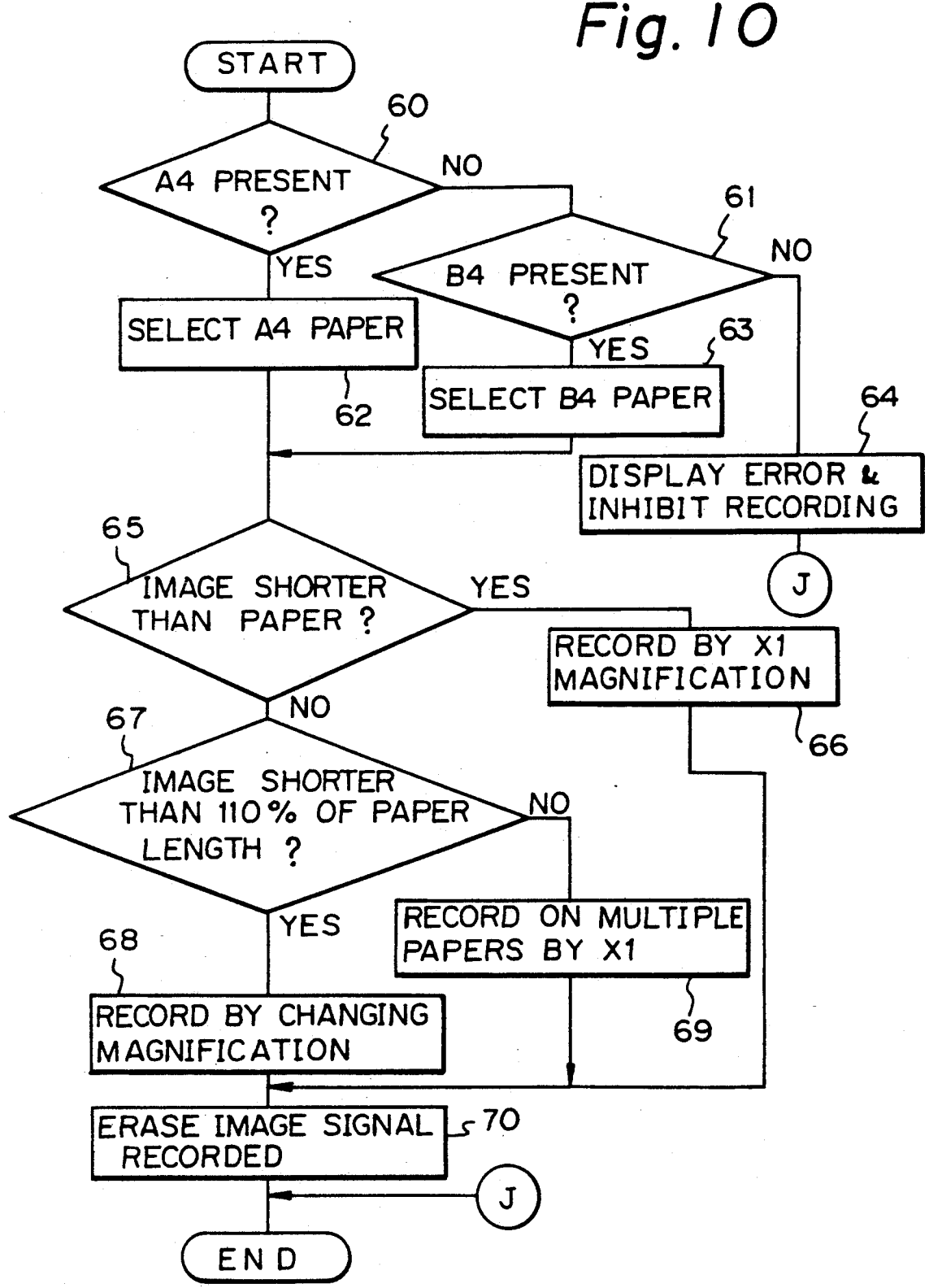
FIG. 10 is a flowchart showing an example of image record processing.

Referring to FIG. 10, there is shown an exemplary procedure for printing out one page of received image. As shown, whether any of papers of A4 size to B4 size are loaded is determined (steps 60 and 61). If any of them is loaded, one of the cassettes 305, 306 and 307 which stores those papers is selected (steps 62 and 63). If none of them is loaded, a message showing that papers of predetermined sizes are not loaded is displayed and a received image is not recorded (step 64). When more than 100% of the image memory 15 is occupied as decided by the step 63 and if papers of A3 size or the like which accommodates the A4 received image without the need for reduction is available, those papers may be selected or, if even such papers are not available, the image may be printed out in a reduced scale on a B5 or A5 paper with which one step of reduction suffices.

When the A4 or B4 papers are selected, whether the length of the received image is shorter than that of the papers is determined on the basis of the number of lines of the received image (step 65). If the answer of the decision 65 is YES, the received image is recorded by ×1 magnification (step 66). If the result of the decision 65 is NO, whether the length of the received image is less than 110% of the length of the papers selected is determined (step 67). If the answer is YES, the image is recorded in a reduced scale of 90% (step 68). If the result of the decision 67 is NO, the received image is recorded in fragments on a plurality of papers by ×1 magnification (step 69). Again, the received image recorded is removed from the image memory 15 (step 70).

In the above-described manner, one page of received image is recorded and, at the same time, the received image in the image memory 15 is erased.

When the received image is to be recorded by the steps 66, 68 and 69, the image and the magnification are reported from the facsimile control 24 to the system control 23 which in turn selects an operation mode of the image processor 14. Consequently, the image data read out of the image memory 15 are restored to the original image and subjected to magnification change processing and then applied to the laser diode driver 17.

Halftone is transmitted by the facsimile function as follows. For halftone, use is made of dot matrix processing. When a matrix for 400 dpi applicable to copying is used for halftone, the size of dots is doubled (four times in area) due to about 200 dpi of facsimile resulting in an illegible image. To solve this problem, two threshold matrices A and B designated by the reference numerals 403 and 404 are provided, as described in detail hereinafter.

Figure 11:
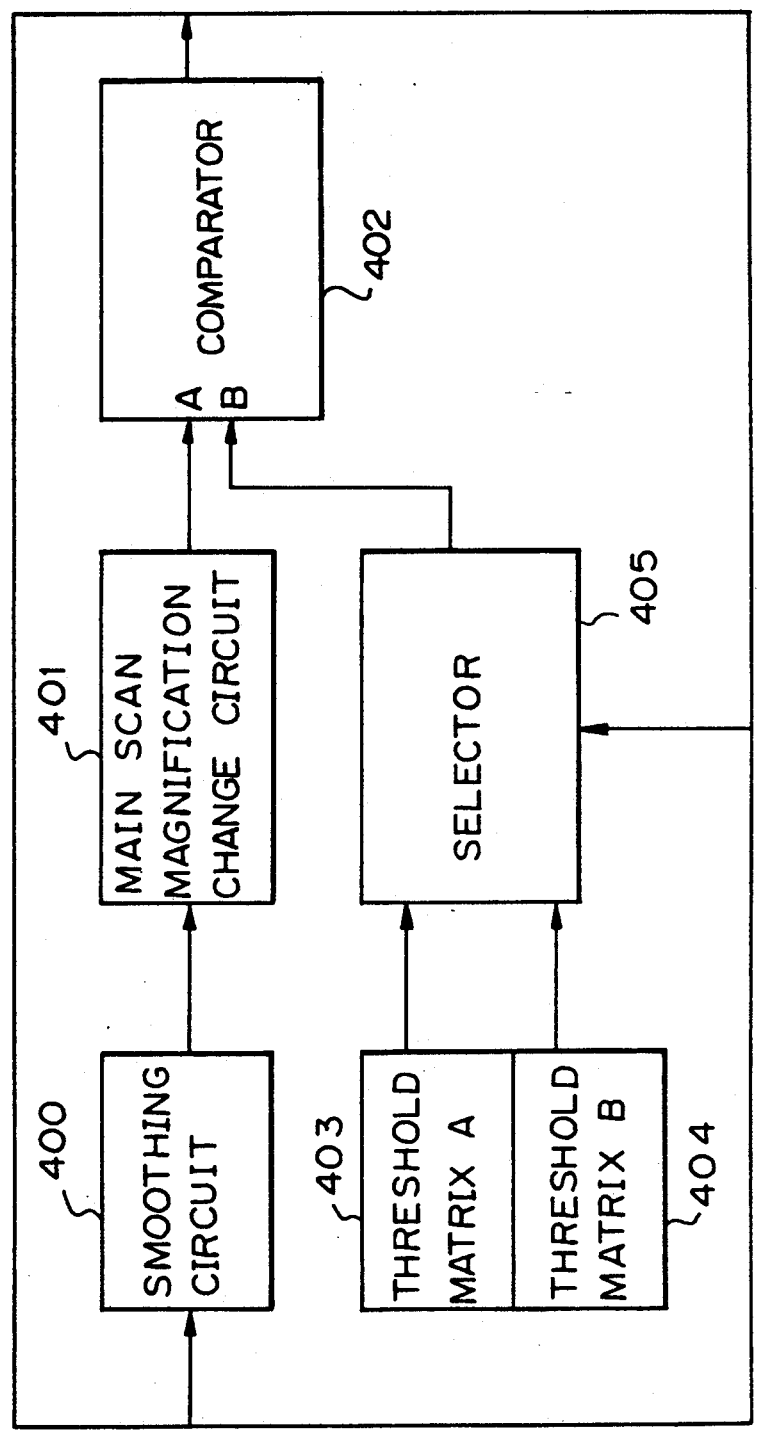
FIG. 11 is a schematic a block diagram representative of halftone processing and magnification change processing.
Figure 12A:
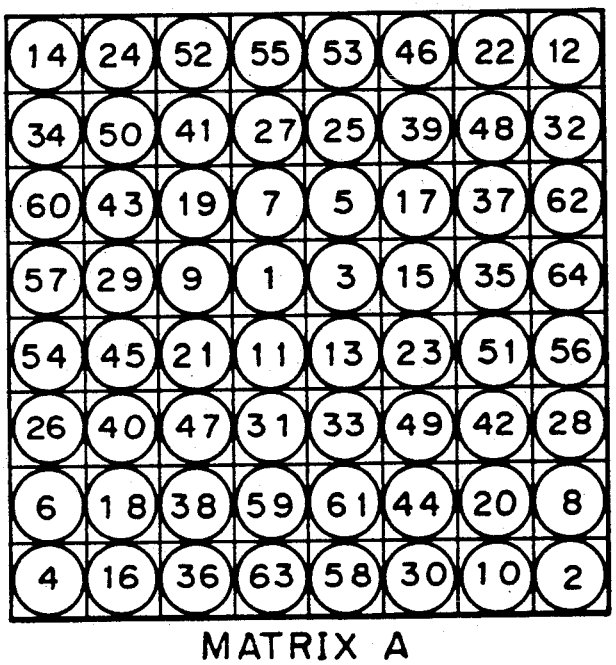
FIGS. 12a and 12b are diagrams showing matrices.
Figure 12B:
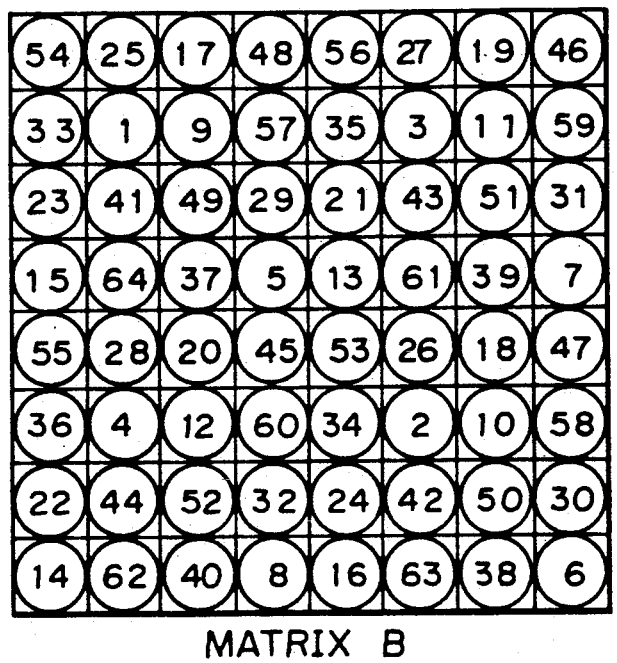
Figure 13:
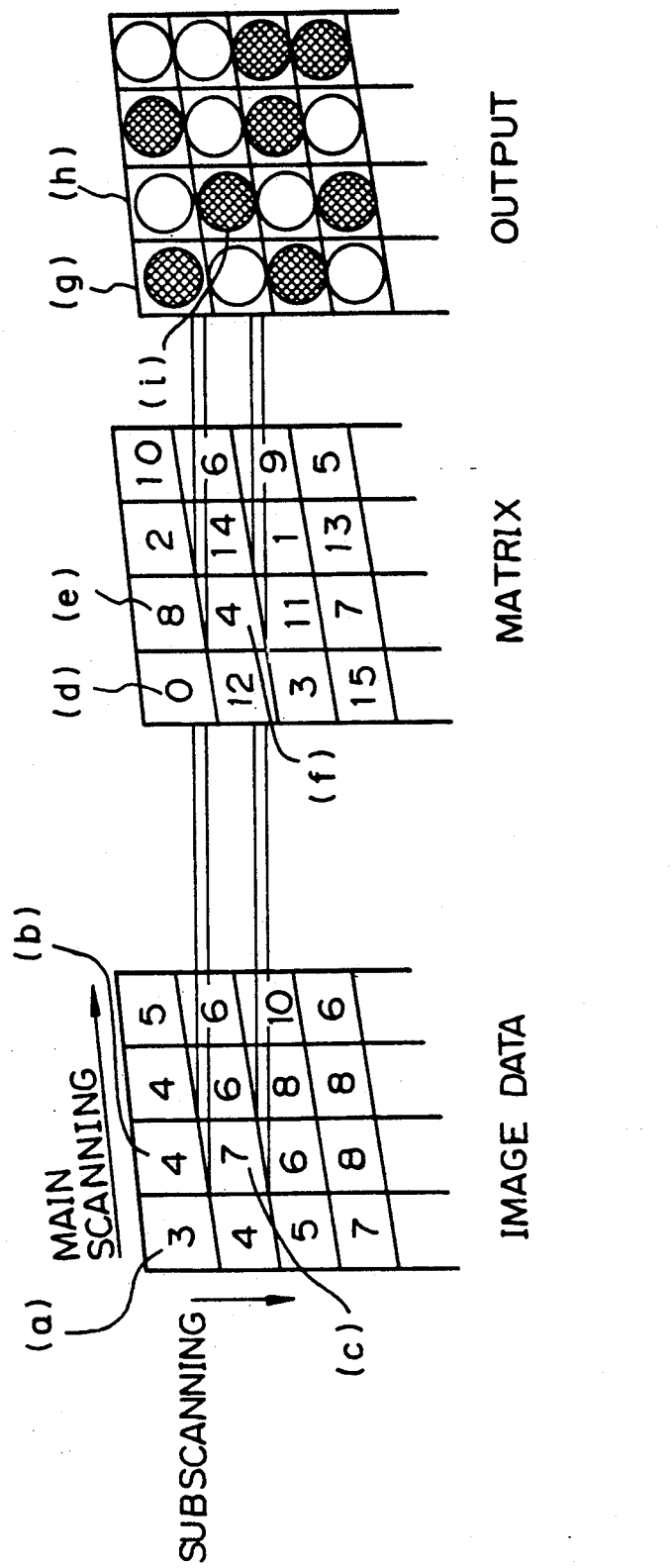
FIG. 13 is a diagram useful for explaining halftone processing which uses the matrices.

The halftone processing and magnification change processing assigned to the image processor 13 of FIG. 3 ar implemented with the function shown in FIG. 11. In FIG. 11, a smoothing circuit 400 is adapted to smooth an image signal, i.e., to eliminate a sharp change between nearby pixels. A main scan magnification change circuit 401 serves to electrically reduce and enlarge an image on one main scanning line. Halftone processing is effected by a comparator 402, the threshold matrices 403 and 404, and a selector 405. FIG. 13 demonstrates the operation of this circuitry. While each of the matrices A and B actually in an 8×8 matrix and therefore representative of sixty-four different tones as shown in FIGS. 12a or 12b, only a 4×4 matrix portion is shown in FIG. 3 for illustration. Image data have multiple levels (one pixel has any of sixteen different steps of density). In FIG. 13, the pixel (a) is shown as having the third step of density while the pixel (b) is shown as having the fourth step of density. Assuming that "0" is white and "15" is black, "4" is representative of light gray. The matrix is adapted to determine which of the levels of the image data should be replaced with white or black. In this example, when the image data is greater than the matrix, it is replaced with a black dot.

Specifically, as regards the value of the image data (a), it is "3" which is greater than "0" of the value (d) of the matrix associated with the image data (a) is "0" and, therefore, the output is "black". Since the value of the image data (b) which is "4" is than the associated value (e) of "8" of the matrix, the output is "white". In the same manner, the image data are individually compared with their associated values of the matrix. By using the two matrices A and B which are different in pattern from each other, it is possible to produce outputs which are different in appearance. In the illustrative embodiment, the matrices A and B are assigned to copying and facsimile, respectively, and one of them is selected by the selector 405 depending upon the function. This guarantees quality reproduction despite the change in density.

Figure 14:
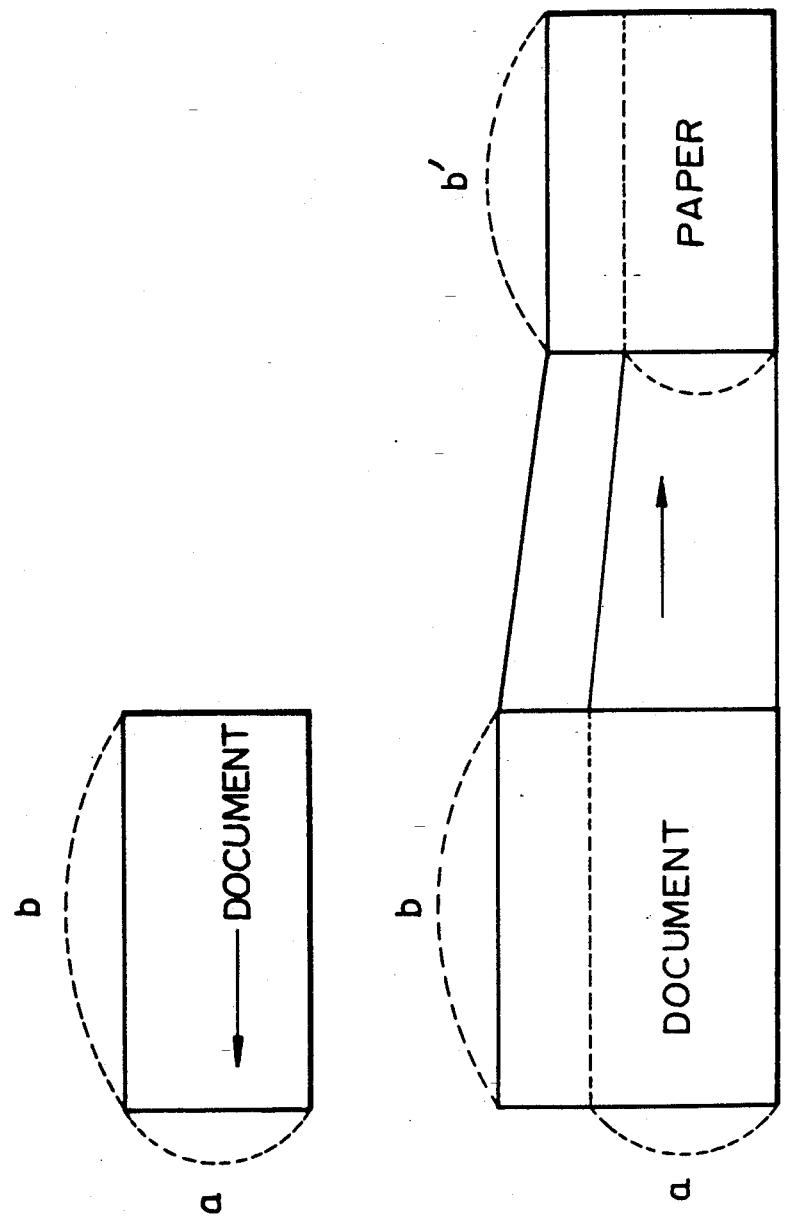
FIGS. 14, 15a and 15b are diagrams each showing a relationship between a document and a print.
Figure 15A:
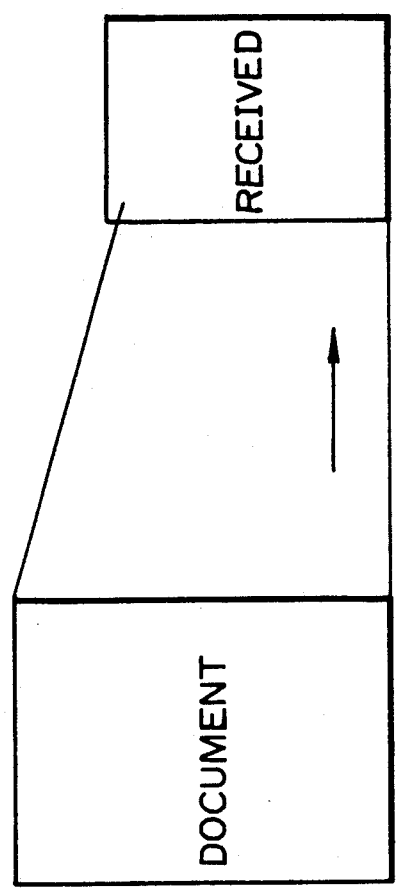
Figure 15B:
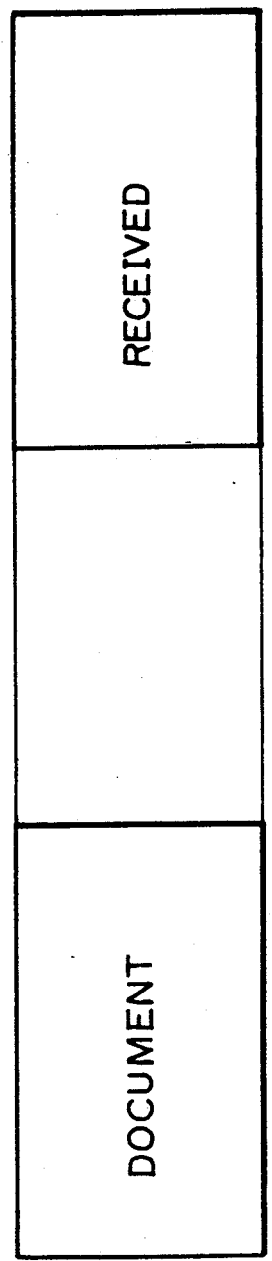

Hereinafter will be discussed how a document should be positioned. When a document is positioned vertically long, a warning is displayed. The widthwise direction of a document is assumed to represent a size, and the lengthwise direction is transmitted over the entire length. Assuming that a paper having an irregular size is read on a presser plate, a fixed size is selected on the basis of the longer side of the paper. For example, when an elongate document such as shown in FIG. 14 is read, its widthwise dimension become greater than its lenghwise dimension in terms of a regular paper size. Hence, assuming that the document of FIG. 14 has a dimension a of 10 centimeters and a dimension b of 36.4 centimeters, the document is decided to be of B4 size. In this condition, if the papers loaded at a remote station which is to receive that document are of A4 size, the document will be reduced in size to become illegible. In the illustrative embodiment, such a problem is eliminated by determining the size of a document on the basis of the widthwise dimension and transmitting the document over its entire length. In this instance, even the same document may be received in different sizes depending upon the position of the document on the feed tray, as shown in FIG. 15a and 15. When a document is laid as shown in FIG. 15a, a warning is produced to alert the operator to such a position of the document. However, even when such a position of the document is positively selected by the operator, it is needless to inhibit the transmission. In this manner, a document is transmitted in the optimal position.

Figure 17A:
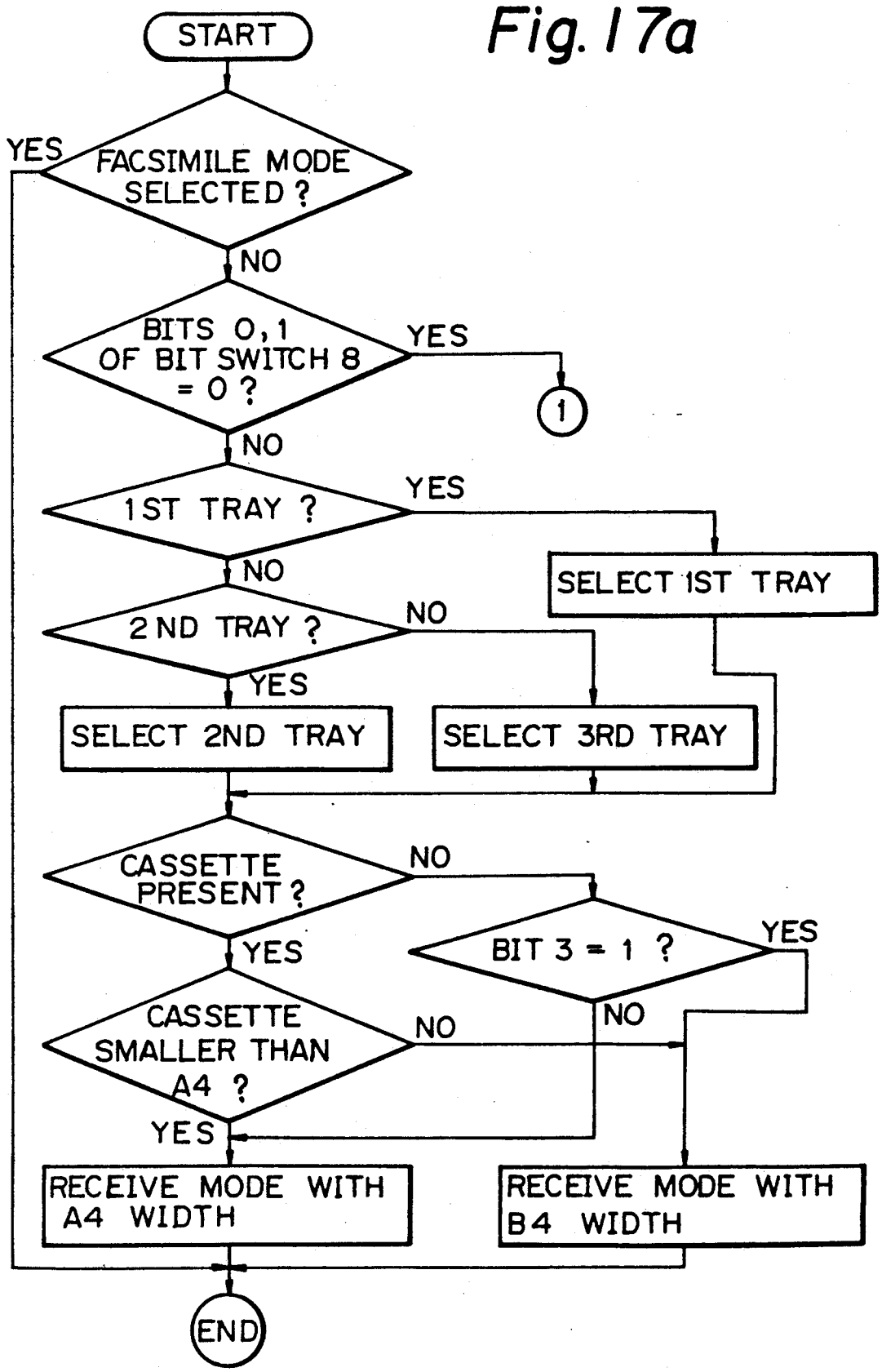
FIGS. 17a, 17b, 18a and 18b are flowcharts each demonstrating the selection of papers.
Figure 17B:
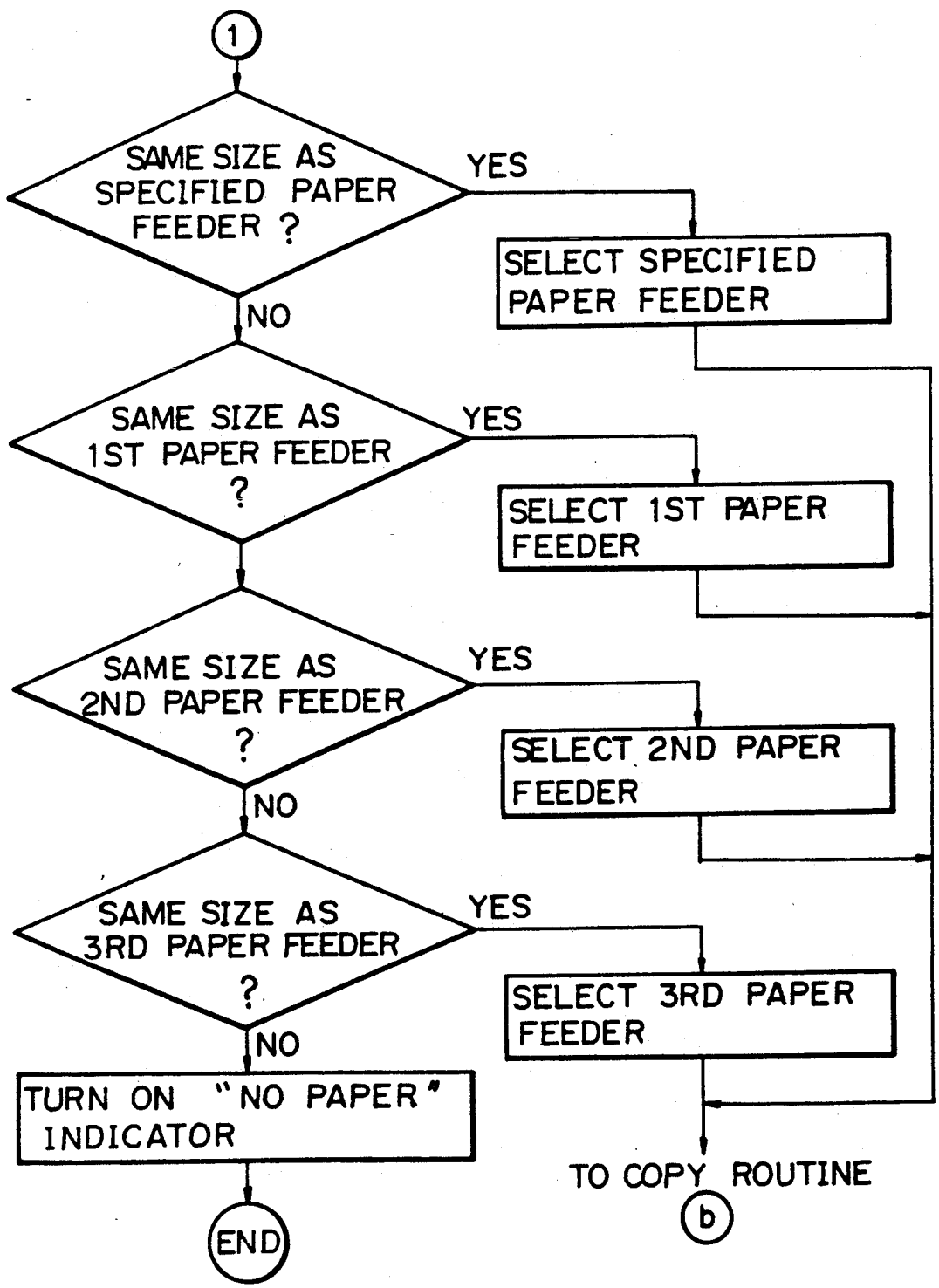
Figures 2, 18A:
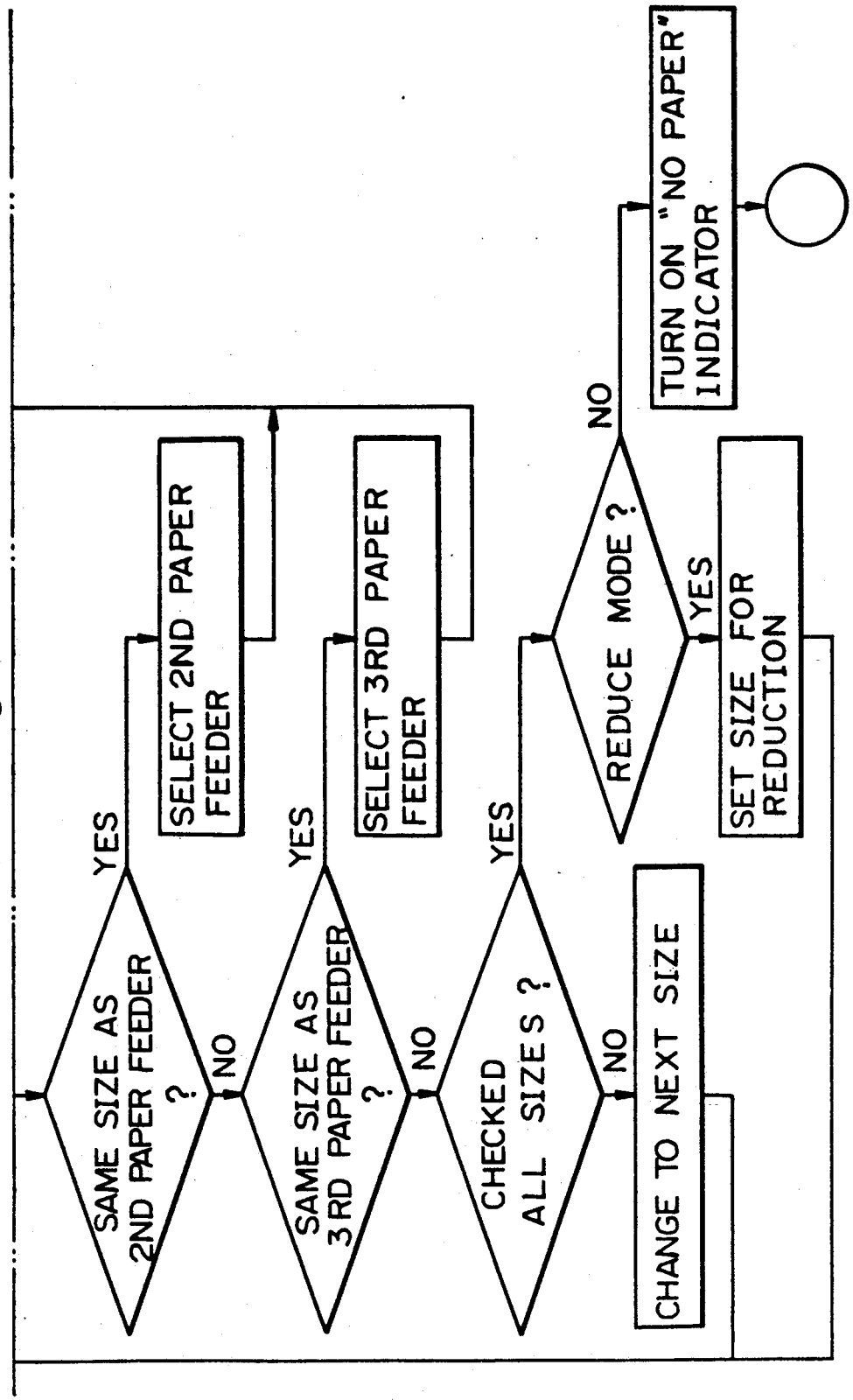
Figure 18B:
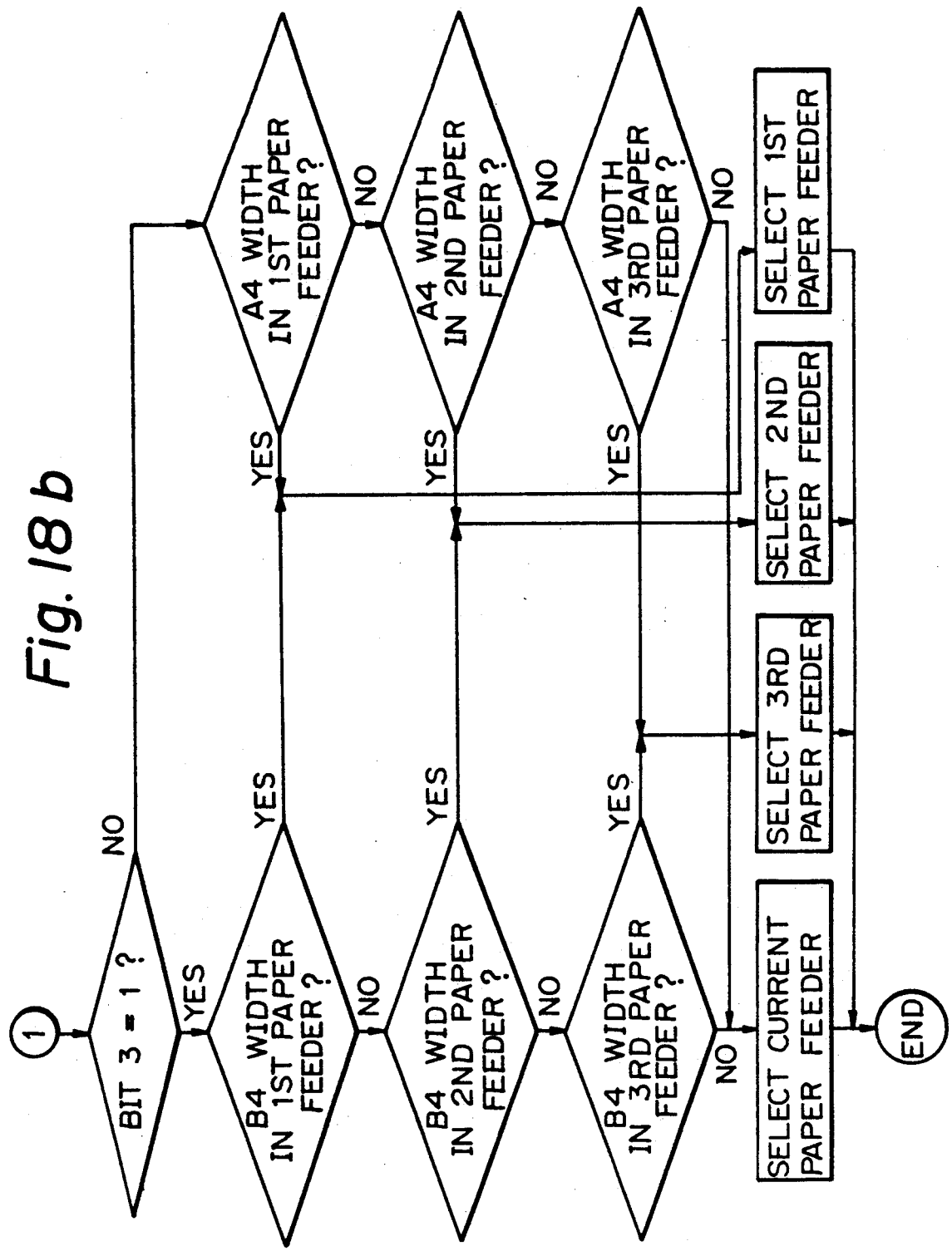

How paper cassettes are selected in the event of facsimile transmission and reception will be described. FIG. 16 shows the contents of a bit switch (which is the same as a dip switch). FIGS. 17a and 17b are flowcharts showing how the paper size of the own station is reported to the other party during reception. FIGS. 18a and 18b are flowcharts showing how papers of a particular size are selected when received data are to be printed out. The operation for reporting the paper size of the own station to the other party is as follows. The paper size available at the receive station is sent by DIS by using the CCITT protocol (see FIG. 7). In the case that a plurality of paper cassettes are used as in the illustrative embodiment, a particular size which should be reported to the other party is uncertain and, therefore, the present invention adopts any of the following two implementations:

(a) the size of papers which are loaded in a particular cassette is predetermined to be the receivable size; and (b) the size of particular papers is predetermined to be the receivable size with no regard to the cassette.

The conditions shown above are indicated by the bit switch 8 shown in FIG. 16. In FIG. 16, bits b0 to b2 are representative of a mode for selecting a particular cassette. Specifically, the first cassette is selected when the bits b0 to b2 are "001", the second cassette is selected when they are "010", and the third cassette is selected when they are "011". The size of papers loaded in the particular cassette selected is determined to be the receivable size.

While papers of format A4, B4 and A3 are usable with a facsimile terminal, an A4 paper may be positioned vertically long or horizontally long as desired and papers of A6 to A3 sizes are usable when it comes to a copier. In the illustrative embodiment, when the width of a paper is smaller than that of A4 size, the paper is determined be of A4 size; when it is not smaller than B4 and not greater than A4, the paper is determined to be of B3 size; and it is equal to A3, the paper is determined to be of B3 size. When any of the feed trays is not loaded with a cassette, a bit b3 of the bit switch 8 which is "0" for A4 and "1" for B4 is used for the decision. The operation described so far is shown in a flowchart in FIGS. 17a and 17b.

As regards how to print out received facsimile data, no problem arises so long as a single roll of paper is used as with an ordinary facsimile terminal. However, when it comes to a copier which is loaded with a plurality of kinds of papers, it is necessary to select papers of a particular kind. In accordance with the present invention, two different approaches are selectively adopted: a fixed size output type approach wherein received data are recorded on papers of the same size with no regard to the data size (optimal for filing), and a received data size type approach wherein received data of B4 size, for example, are recorded on a paper of B4 size.

FIG. 18a shows the received size output type approach while FIG. 18b shows the fixed size output type approach. In FIG. 18a, papers of a particular size are searched for and, if they are not found, the size is changed to select papers of the new size. For example, assuming that received data size is A4, paper sizes are sequentially selected in the order of A4R, B4, A3, B5T and A4T. Further, when the received data size is B4, paper sizes are sequentially selected in the order of B4, A3, B5T, A4T, B5T and A4T.

Figure 19:
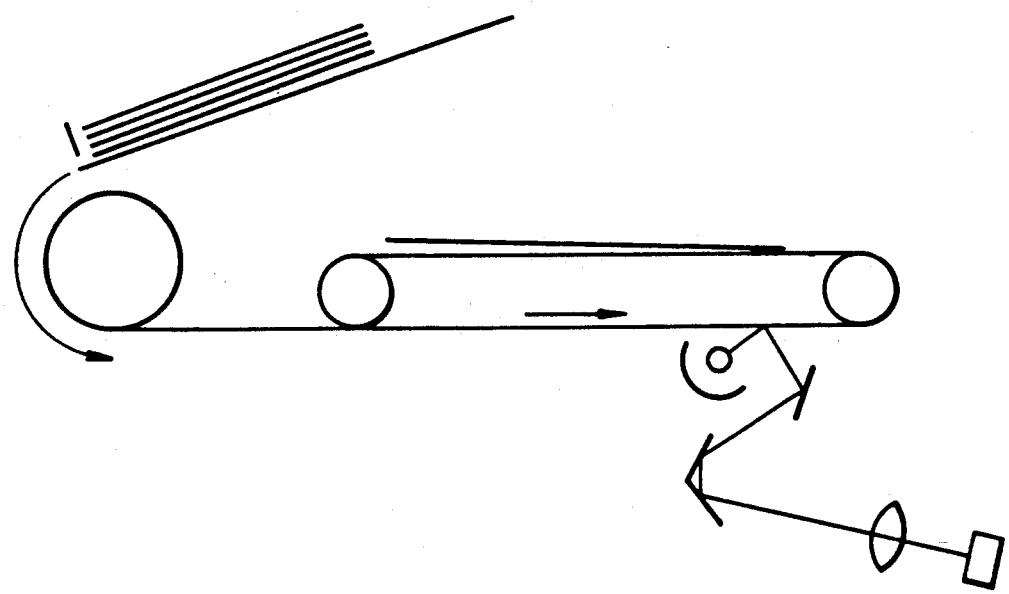
FIGS. 19 and 20 are schematic views showing a document feeder.
Figure 20:
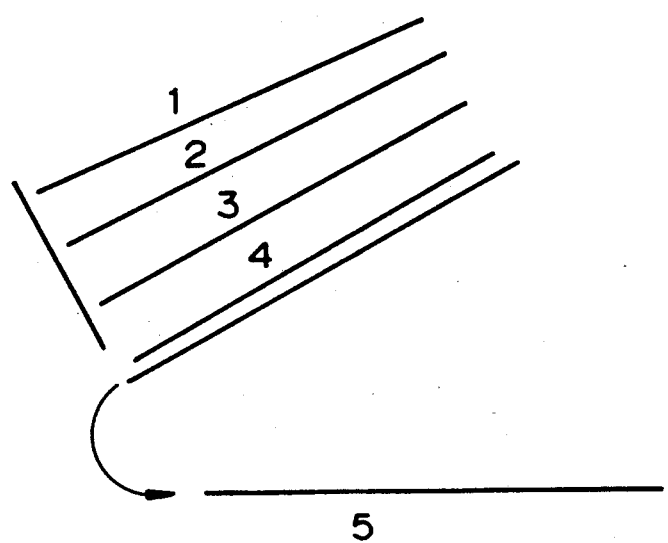

What occurs when a cover plate and a document feeder are selectively used to send a document is as follows. When a cover plate is used, since the operator sequentially loads the first document and onward, the documents are sequentially written in the memory as shown in FIG. 21a. All that is required in this condition is reading them out in the order they are written in the event of transmission. On the other hand, when the document feeder is used which in the illustrative embodiment reads the last page first as shown in FIGS. 19 and 20, the last page is written in the memory first as shown in FIG. 21b. Hence, the documents have to be read out of the memory in the opposite order to the reading order.

Figure 22:
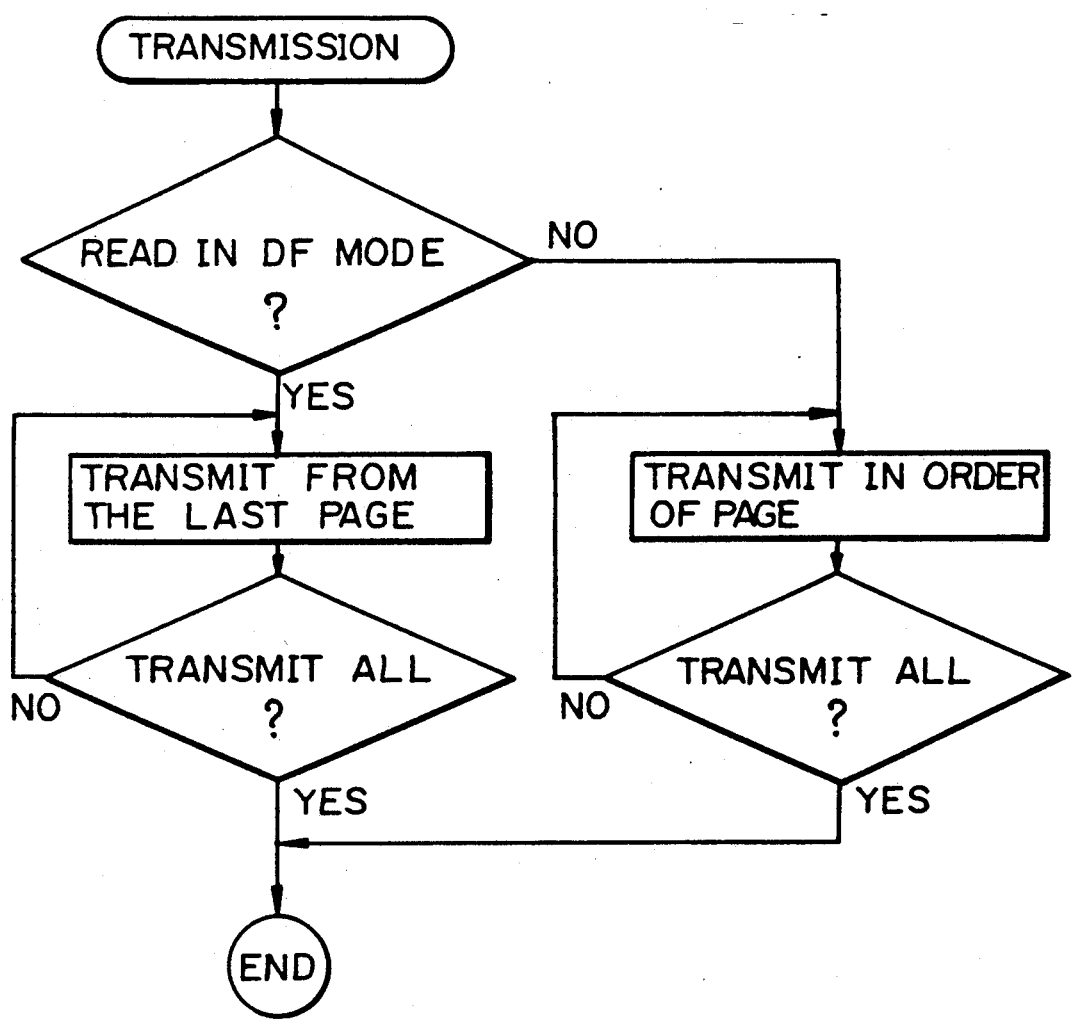
FIGS. 22 and 23 are flowcharts each showing the control over the order of papers.
Figure 23:
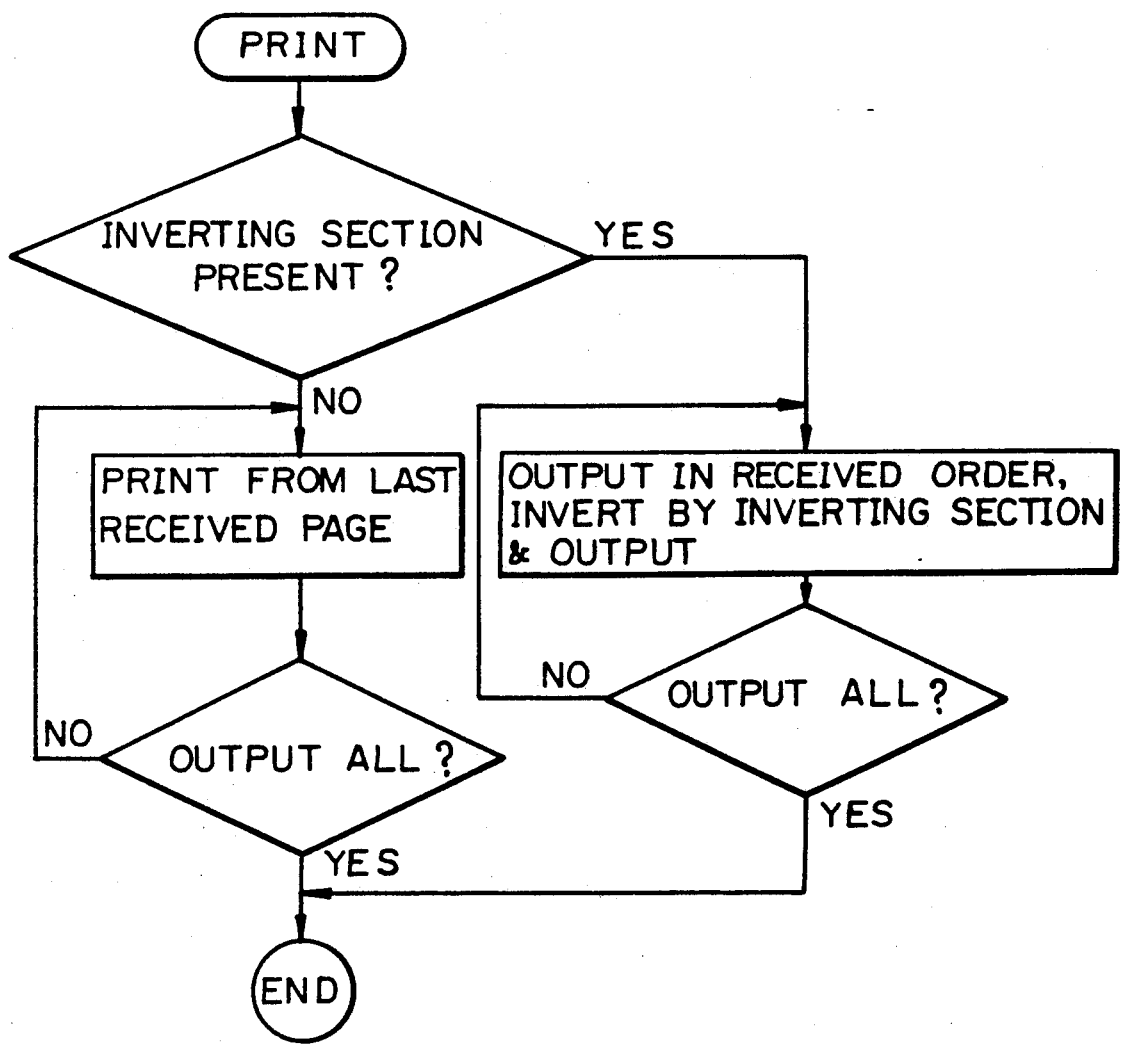

In accordance with the present invention, as shown in FIG. 22, the documents reads by the document feeder are sequentially fed from the last page to the first page while in the case of cover plate they are fed in the order they are read. Likewise, when the distributing section 315 and reversing section 316 are provided as shown in FIG. 1, received data are sequentially read out in the order they are received so that papers are sequentially stacked on the stacker in the order of page. Even in a relatively inexpensive machine which lacks the sections 315 and 316, it suffices to read received data out of the memory from the last page to the first page, as shown in FIG. 23.

In the copier with the inverting section 316 shown in FIG. 1, the inverting section 316 may be inhibited from operating as discussed with reference to FIG. 2. Whether or not to activate the section 316 may be entered on the operation and display section 19. Stated another way, whether or not the section 315 is operable is not known at the time of outputting received facsimile data. In accordance with the present invention, when received data are to be outputted, the section 315 may be forcibly operated with no regard to the operator's intention so as to record the data in the order they received, or alternatively, the data may be outputted in the order they received when the operator commands the inversion and in the opposite order when the operator does not command it.

The sequence of reading data out of the SAF memory is controlled as follows. Image data, whether they be fed from the scanner or from the MODEM, are sequentially written in the SAF memory in the order page. In this instance, the leading addresses of the individual pages are written in another area of the memory, i.e., the leading address of the first page is writtein in an address a, that of the second page in an address b, . . . , that of the "n−1" page in an address y, and that of the "n" page in an address z. Further, data representative of the end of a page is added to the image data of each page. In this condition, when the data are read out in the order they are stored, the addresses a, b, . . . and z are sequentially read in this order. On the other hand, when the data are read in the opposite order, the "n" page is read out of the address z to be transmitted first, then the image data of the "n" page are read out, and then the "n−1" page is read out of the address y. This is repeated until the first page is read out of the address z to complete the n-th transmission. The same is true with the print-out of received data.

Figure 24:
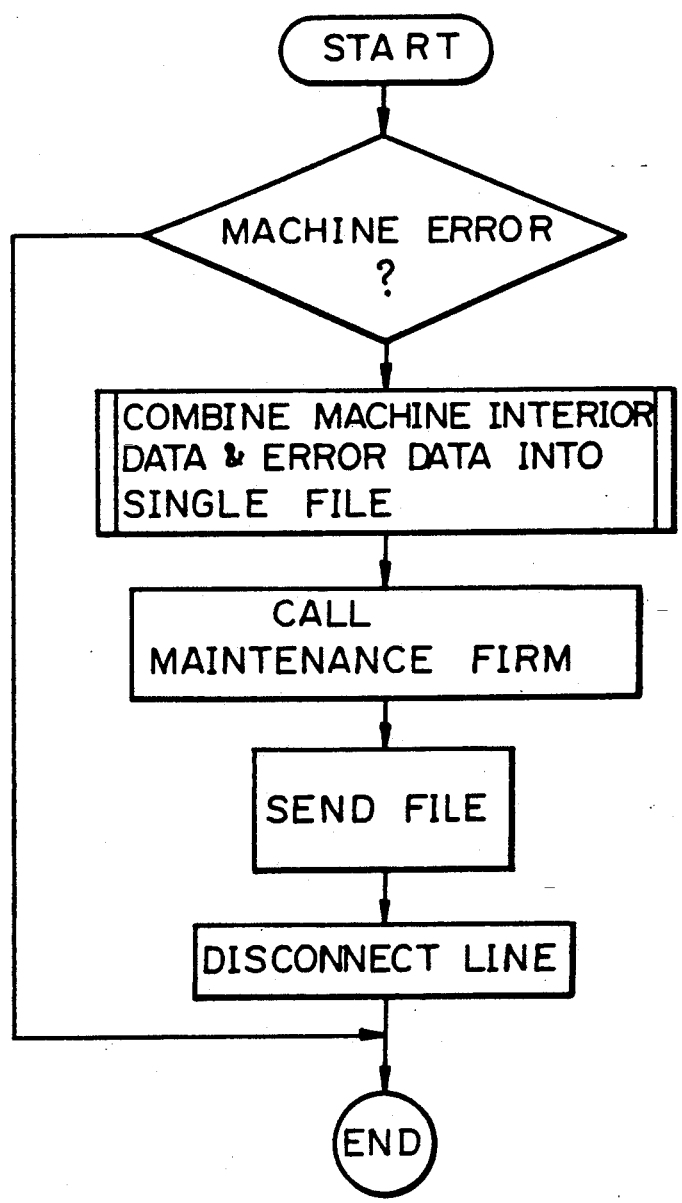
FIG. 24 is a flowchart demonstrating error processing.
Figure 26:
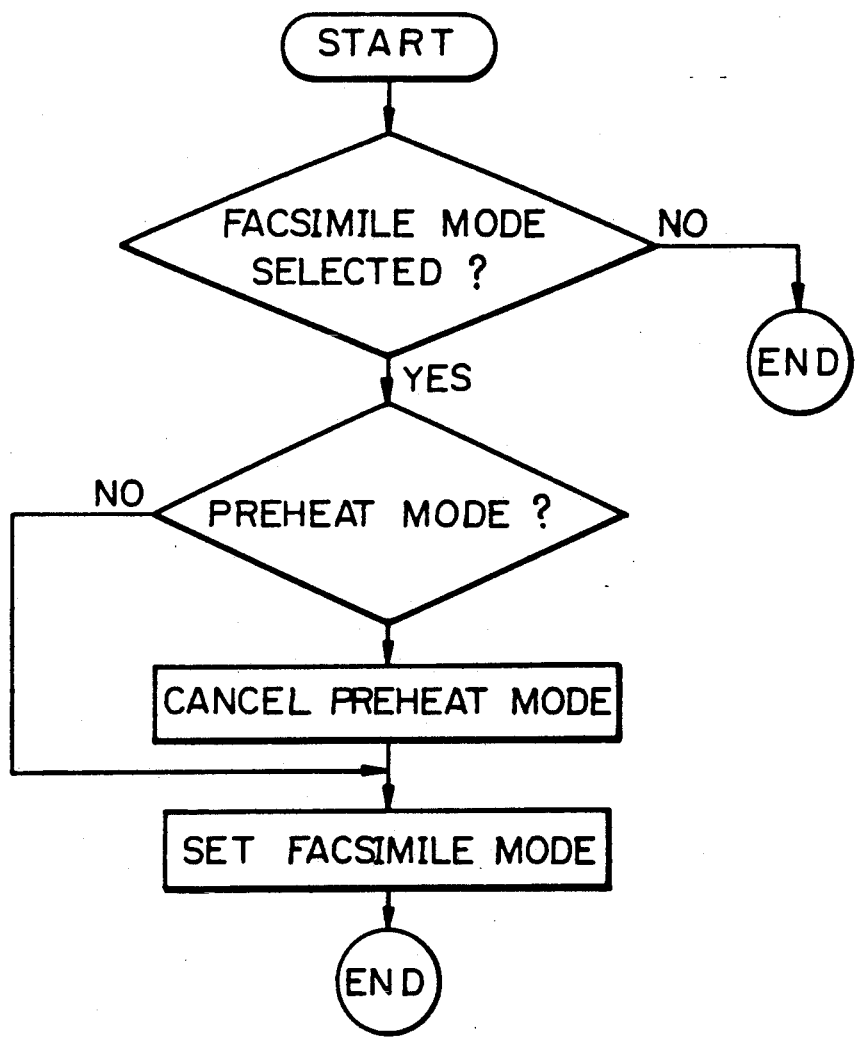
FIGS. 26, 27a, 27b, 27c and 28 are flowcharts associated with a preheat mode.

The copier with a facsimile function of the present invention which is connected to a communication line has an extra function. Specifically, as shown in FIG. 24, an error code representative of an error occurred in the machine is transformed into image data for facsimile together with the machine history and data and sent to a maintenance firm. This promotes remote detection of errors and therefore rapid repair. An example such data which may be sent to a maintenance firm is shown in FIG. 25. In the case of a mchine without a facsimile function, the error data may be printed out by a plotter.

With a facsimile terminal having a scanner electrostatic block, a prerequisite is that even before a plotter builds up the transmission is allowed to reduce the waiting time. When facsimile data are received in the preheat mode or while a weekly timer is in operation, such a mode is cancelled to print out the received data. Heretofore, a scanner and a plotter have been considered in combination and, therefore, any error of the plotter has inhibited the scanner from operated at the time of transmission.

Assuming that facsimile data are received while the copier is in the preheat mode or while its power is turned off due to the use of a weekly timer, whether the copier is in the preheat mode or the power is turned off due to the use of a weekly timer is determined. When the copier is in a copying operation, the received data are not printed out. When the preheat mode or the weekly timer mode is under way, it is cancelled and the copier is powered to activate the various units (or only those units necessary for print-out) and, then, the received data are printed out. Thereafter, the copier is restored to the preheat mode or the weekly timer mode upon the lapse of a predetermined period of time. When it is desired to transmit facsimile data while the copier is in the preheat mode, a facsimile key is pressed to automatically cancel the preheat mode and set up a facsimile mode instead. Allowing the facsimile mode to be set up after the cancellation of the preheat mode would result in troublesome manipulation.

Figure 27A:
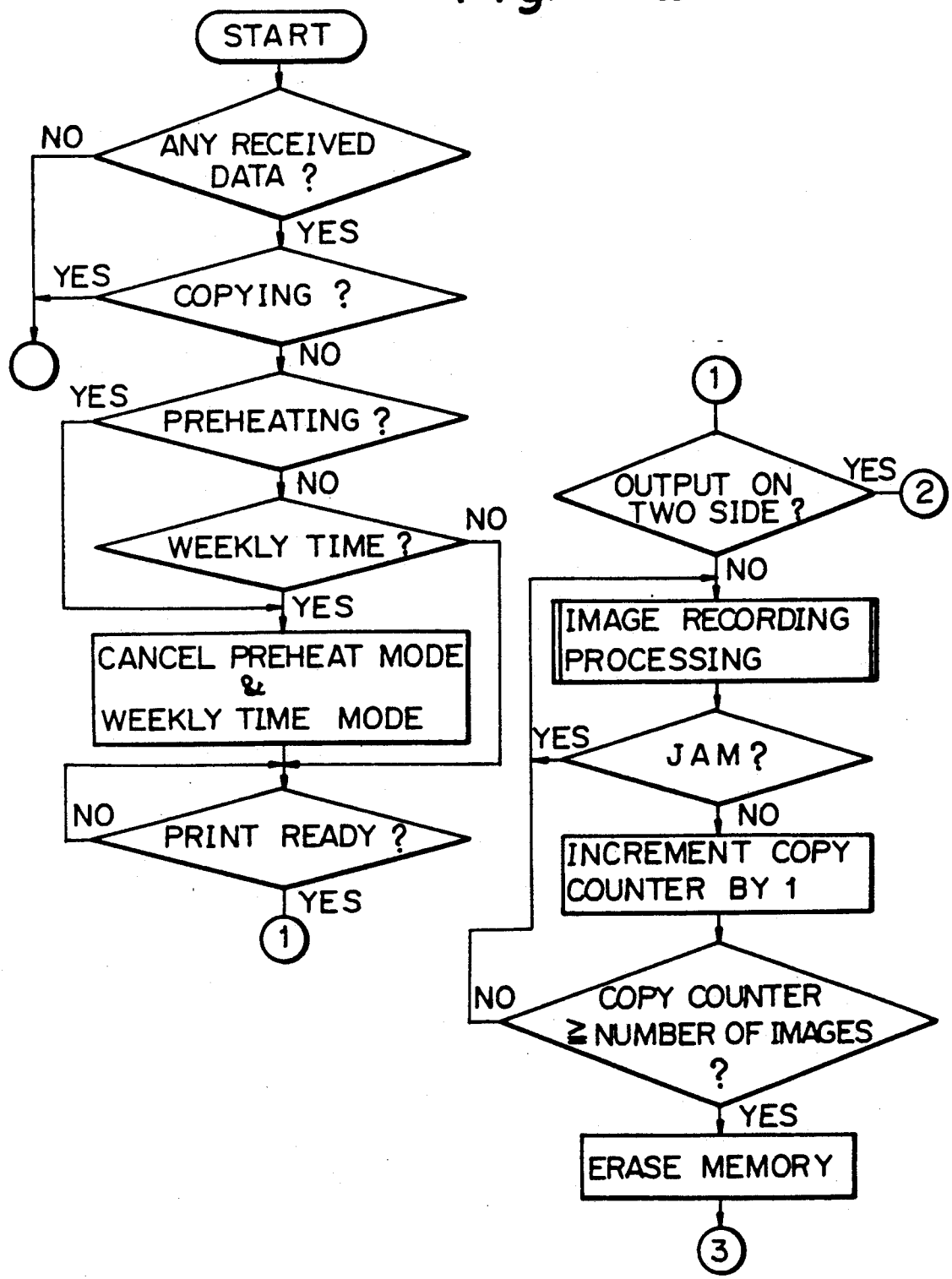
Figure 27B:
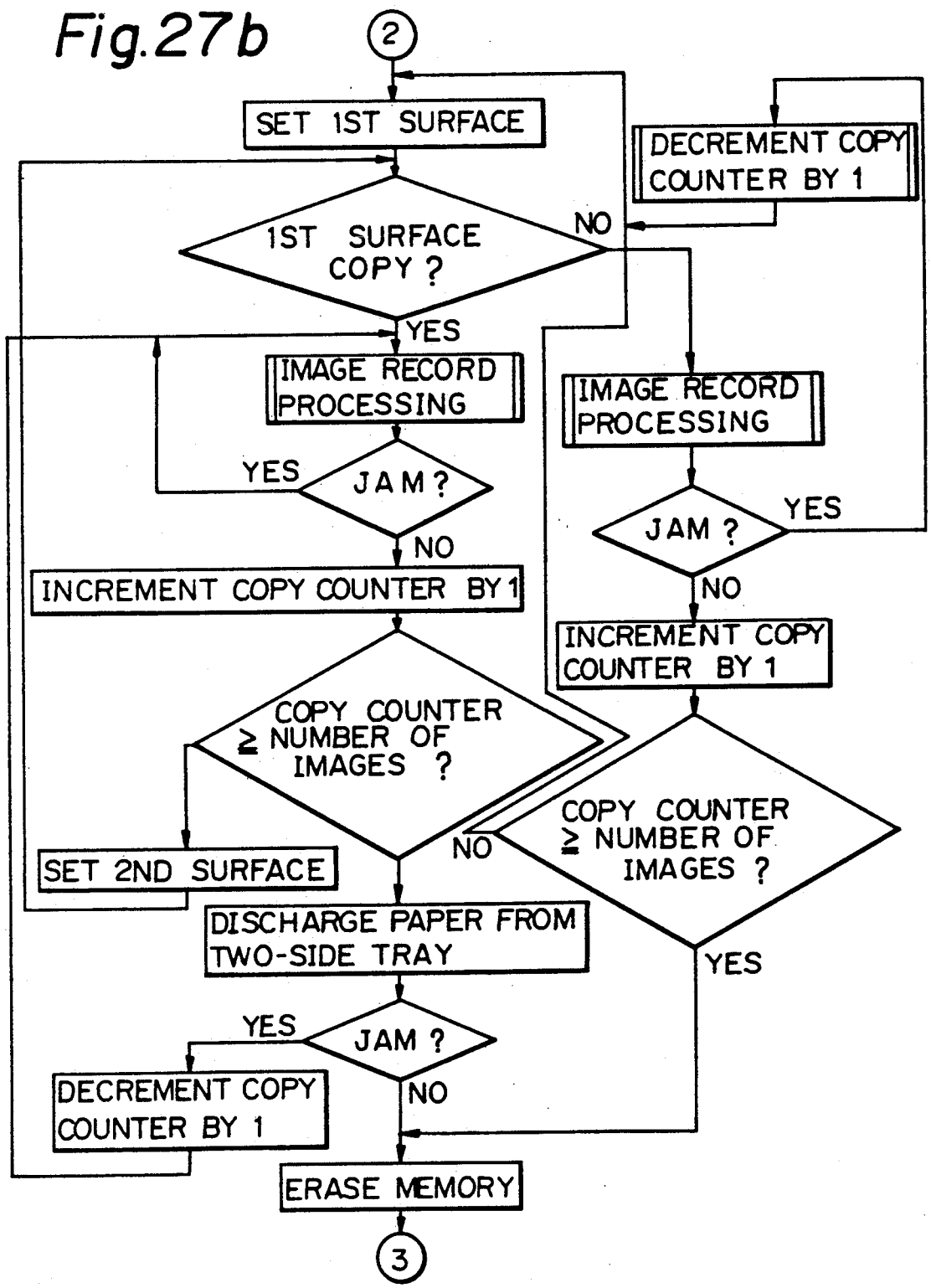
Figure 27C:
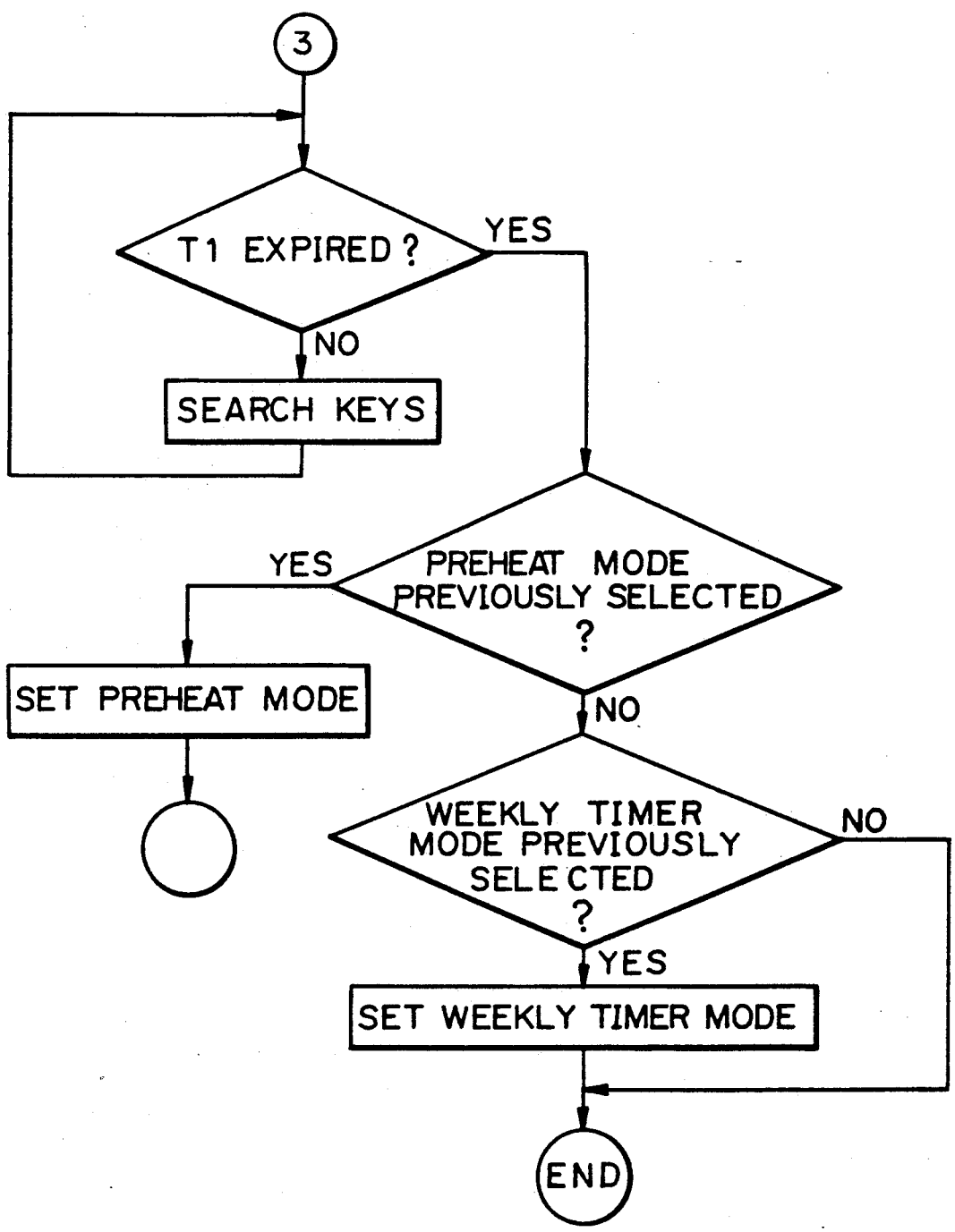
Figure 28:
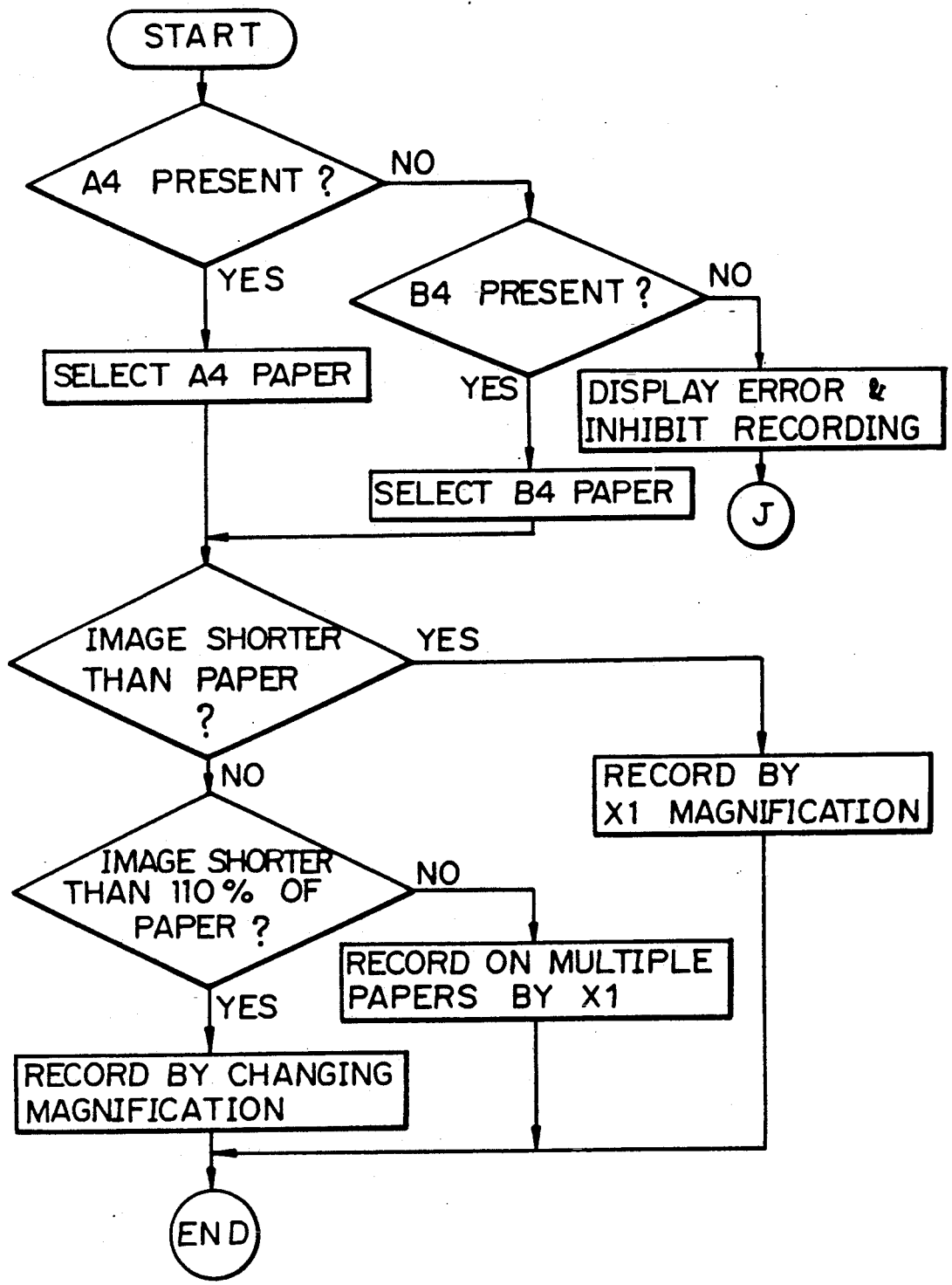

FIGS. 27a, 27b and 27c show the situations wherein facsimile data are received during the preheat mode operation, copy mode operation and weekly timer mode operation. Specifically, FIG. 27a shows a usual copying operation while FIG. 27b shows a condition wherein received data are printed out on both sides of a paper. In FIG. 27b, in a mode other than the two-side copy mode, one page of data are read out and recorded by the processing of FIG. 28. In the event that a paper jams, the paper is removed and then the same data are recorded. If the output is normal, a copy counter is incremented by one. If there is any data to follow, the data are recorded according to the count of the copy counter.

After all the data stored in the memory have been recorded, the memory is erased. In FIG. 27b, a first surface mode is set first. Then, whether or not the copy is the first copy is determined and, if it is the first copy, it is routed to the image recording section and further to the transporting section 321 of FIG. 1. When this paper jams, the same data are outputted after the removal of the jamming paper. As a paper is guided to the transporting section 321, the copy counter is incremented by one. When there is no image data to follow, the paper is automatically discharged. When there is any image data to follow, on which page the data should be printed out is controlled by the copy counter. If this paper jams, the copy counter is decremented by one and the program is returned to the first surface routine, because data have to be printed out on the first surface again. When the data are correctly printed out on the second surface or back of the paper also and if no data is left, the memory is erased. FIG. 27c shows postprocessing. In FIG. 27c, the copier is continuously powered for a predetermined period of time to check the keys and the reception of next data. If nothing occurs during that period of time, the copier is restored to the original condition. In the illustrative embodiment, the print-out of data which occurred in the preheat mode is followed by the preheat mode while that which occurred in the weekly timer mode is followed by the shut-off of power supply if the time to turn on the power source is not reached. FIGS. 29a to 29h are timing charts showing a case wherein received data are printed out on both sides of a paper.

In summary, it will be seen that a digital copier with a facsimile function of the present invention allows an original document with halftone to be transmitted and received with a minimum of degradation of image quality.

Various modifications will become possible for those skilled in the art after receiving the teachings of the present disclosure without departing from the scope thereof.

What is claimed is:

1. An image forming apparatus comprising:
   a plurality of paper feed sections in each of which a paper cassette may be mounted;
   paper size sensing means for sensing sizes of papers which are loaded in said paper cassettes which are mounted in said paper feed sections;
   paper feed section selecting means for specifying one of said paper feed sections;
   setting means for setting a size of an image to be formed on a given size of paper loaded in one of the paper cassette which is mounted in any of said paper feed sections which is selected by said paper feed section selecting means;
   optical means for receiving an image to be formed from an optical system;
   digital reception means for receiving from an image producing means an image to be formed;
   memory means for storing said image received from said digital reception means during a time period when said optical means is receiving an image; and
   means for producing an image from said optical means, said digital reception means and said memory means on said paper which has been selected.

2. An image forming apparatus as claimed in claim 1, wherein said setting means is constructed to set an A4 size when the paper size is smaller than A4.

3. An image forming apparatus as claimed in claim 1, wherein the size of the image to be formed is specified when no paper cassette is mounted in the paper feed section which is specified by said paper feed section selecting means.

4. An image forming apparatus as claimed in claim 2, wherein the size of the image to be formed is specified when no paper cassette is mounted in the paper feed section which is specified by said paper feed section selecting means.

5. An image forming means as in claim 1 further comprising:
   means for producing an image on both sides of a sheet of paper.

6. An image forming apparatus as in claim 1, further comprising:
   control means coupled to said setting means such that if a size which is not a predetermined size is entered a warning is given if the size of said document in its widthwise dimension and lengthwise dimension is the same as a predetermined size of the lengthwise dimension and the width dimension of the entered size.

7. An image forming apparatus as in claim 1, further comprising:
   control means for determining the order upon which documents are read out of said memory means such that documents may be produced in a first page to last order or a last page to first page in order.

8. An image forming apparatus as in claim 1, further comprising: a means for preheating said means for producing an image on said paper when said digital reception means first receives a signal indicative of a digital image being received thereby.

9. An image forming apparatus as claimed in claim 1, further comprising:
   means for reducing or enlarging the size of the image to be formed when the size of the image to be formed and the given size of the paper are different from each other.

10. An image forming apparatus as claimed in claim 9, further comprising:
    means for changing the resolution of the image to be formed in accordance with the reduction or enlargement thereof.

* * * * *

UNITED STATES PATENT AND TRADEMARK OFFICE
CERTIFICATE OF CORRECTION

PATENT NO. : 5,019,916
DATED : May 28, 1991
INVENTOR(S) : Masaaki Ogura It is certified that error appears in the above-identified patent and that said Letters Patent is hereby corrected as shown below:

On the title page:

The Related U.S. Application data has been omitted, should be, --Continuation of Serial No. 07/191,579 filed May 9, 1988, now abandoned--.

Signed and Sealed this

Fifth Day of January, 1993

*Attest:*

DOUGLAS B. COMER

*Attesting Officer*     *Acting Commissioner of Patents and Trademarks*